United States Patent
Katsurahira

(10) Patent No.: US 10,331,243 B2
(45) Date of Patent: Jun. 25, 2019

(54) POSITION INDICATING MODULE AND STYLUS PEN

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 228 days.

(21) Appl. No.: 15/188,770

(22) Filed: Jun. 21, 2016

(65) Prior Publication Data

US 2016/0313812 A1   Oct. 27, 2016

Related U.S. Application Data

(63) Continuation of application No. PCT/JP2014/082475, filed on Dec. 9, 2014.

(30) Foreign Application Priority Data

Dec. 25, 2013 (JP) ................................ 2013-266230

(51) Int. Cl.
  *G06F 3/033* (2013.01)
  *G06F 3/038* (2013.01)
  *G06F 3/0354* (2013.01)

(52) U.S. Cl.
  CPC ........ *G06F 3/0383* (2013.01); *G06F 3/03545* (2013.01)

(58) Field of Classification Search
  CPC .................... G06F 3/03545; G06F 3/0383
  (Continued)

(56) References Cited

U.S. PATENT DOCUMENTS

| 5,736,980 A | 4/1998 | Iguchi et al. |
| 2010/0212976 A1* | 8/2010 | Baba ........... G06F 3/03545 |
| | | 178/19.01 |

(Continued)

FOREIGN PATENT DOCUMENTS

| EP | 2 395 524 A1 | 12/2011 |
| EP | 2 631 625 A2 | 8/2013 |

(Continued)

OTHER PUBLICATIONS

Extended European Search Report, dated Jul. 19, 2017, for European Application No. 14875310.6-1972 / 3091423, 9 pages.

(Continued)

*Primary Examiner* — Robert Michaud
(74) *Attorney, Agent, or Firm* — Seed IP Law Group LLP

(57) ABSTRACT

A position indicating device includes a variable capacitance capacitor, which has: a first electrode; a second electrode; and a dielectric separating the first electrode and the second electrode. A capacitance of the variable capacitance capacitor varies in response to application of pressure to the variable capacitance capacitor. The position indicating device also includes a core body having a tip including a third electrode, wherein, in operation, a signal is transmitted by the third electrode and pressure applied to the tip of the core body is transmitted to the variable capacitance capacitor, varying the capacitance of the variable capacitance capacitor. The position indicating device also includes a first terminal electrically connected to the first electrode; a second terminal electrically connected to the second electrode; a third terminal; and a core body holder configured to electrically connect the third electrode to the third terminal.

15 Claims, 24 Drawing Sheets

(58) Field of Classification Search
IPC .............................. G06F 3/0416,3/0412, 3/044
See application file for complete search history.

(56) References Cited

U.S. PATENT DOCUMENTS

| | | | |
|---|---|---|---|
| 2011/0115753 A1* | 5/2011 | Katsurahira | ........ G06F 3/03545 |
| | | | 345/179 |
| 2011/0192658 A1* | 8/2011 | Fukushima | ......... G06F 3/03545 |
| | | | 178/19.03 |
| 2011/0193776 A1* | 8/2011 | Oda | ........................ G06F 3/046 |
| | | | 345/157 |
| 2012/0074962 A1 | 3/2012 | Fukushima et al. | |

FOREIGN PATENT DOCUMENTS

| | | | |
|---|---|---|---|
| JP | 5-275283 | A | 10/1993 |
| JP | 6-250772 | A | 9/1994 |
| JP | 7-295722 | A | 10/1995 |
| JP | 7-319603 | A | 12/1995 |
| JP | 2007-164356 | A | 6/2007 |
| JP | 2011-186803 | A | 9/2011 |
| JP | 2012-69888 | A | 4/2012 |
| JP | 2013-156066 | A | 8/2013 |
| JP | 2014-35631 | A | 2/2014 |

OTHER PUBLICATIONS

International Search Report, dated Mar. 10, 2015, issued in corresponding International Application No. PCT/JP2014/082475, filed Dec. 9, 2014, 1 page.

* cited by examiner

FIG. 2
(A)
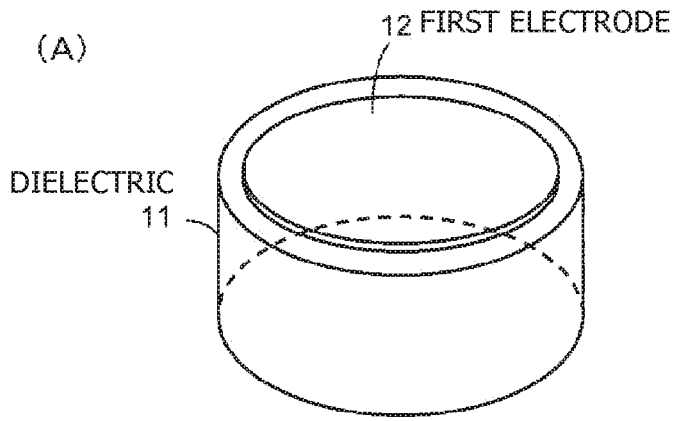
(B)
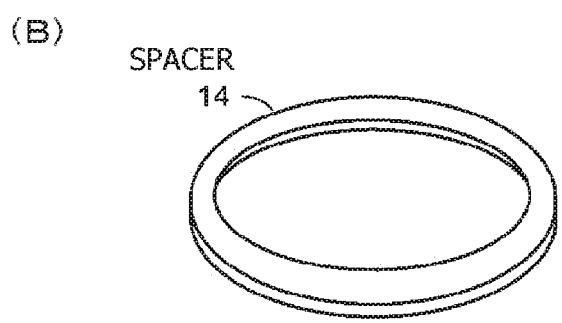
(C)
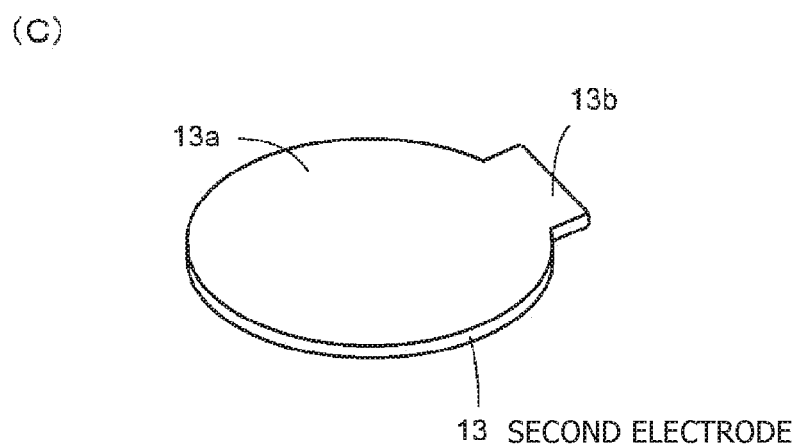

BLOCK DIAGRAM OF TABLET

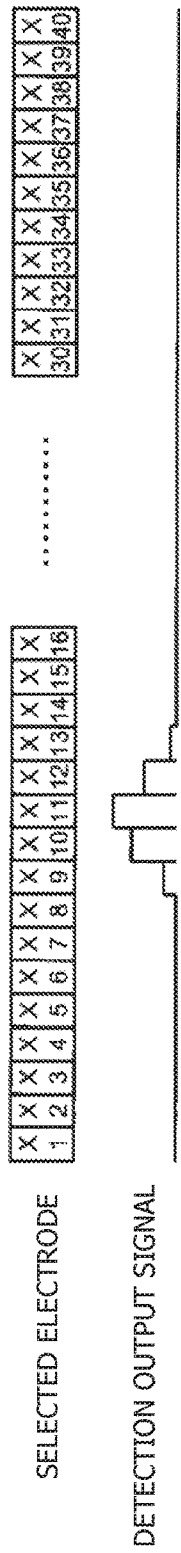

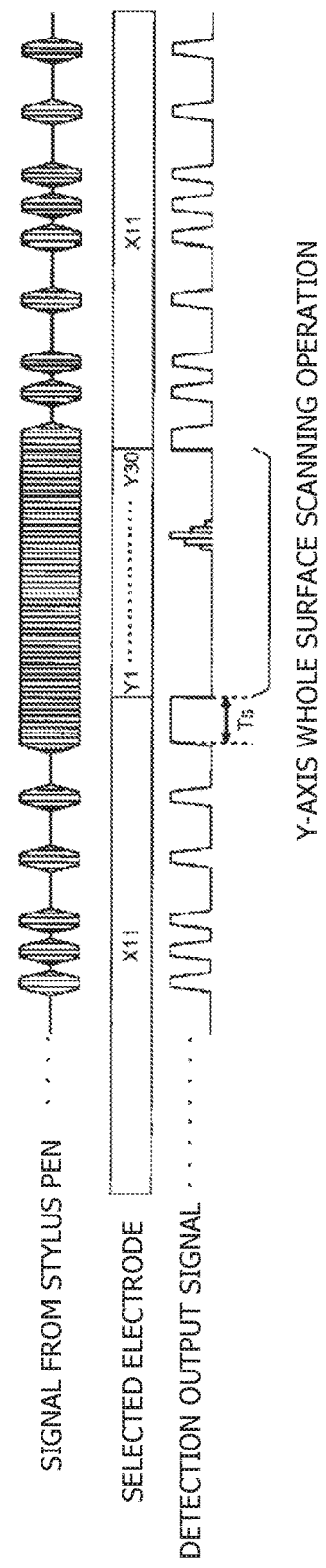

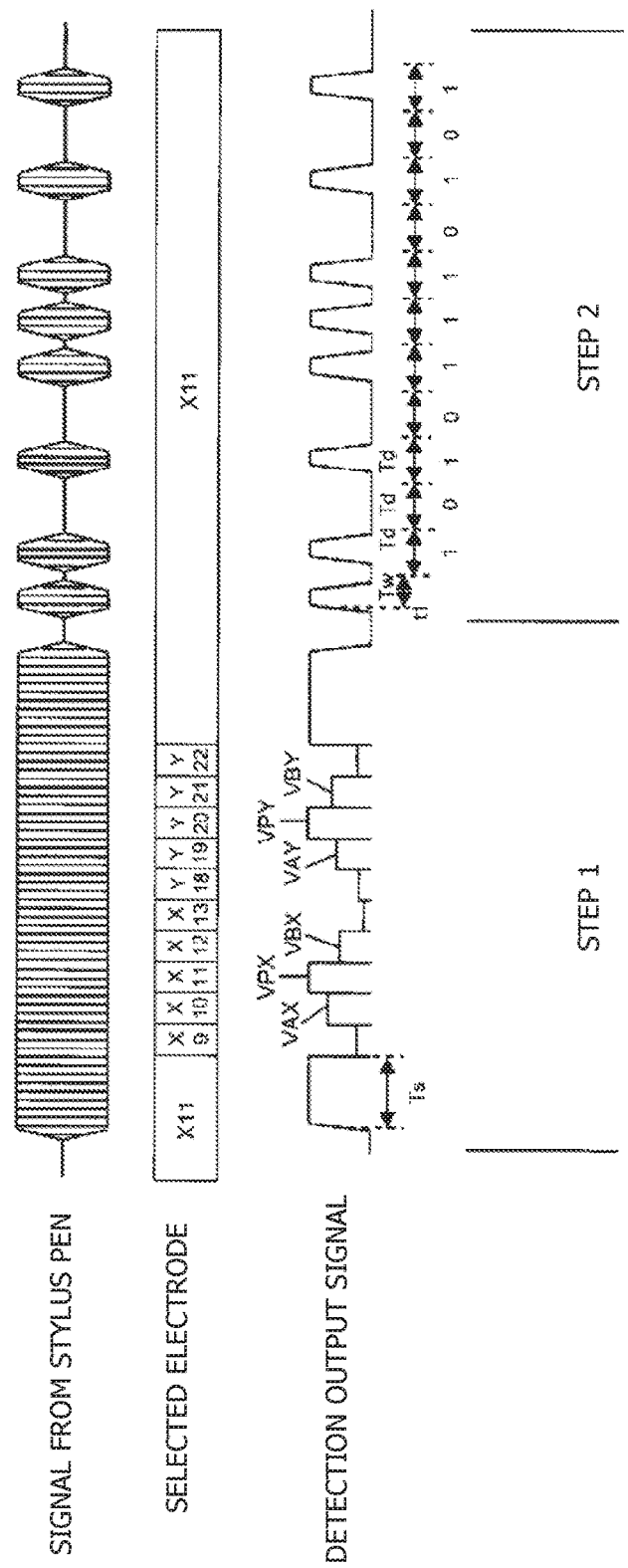

POSITION INDICATING MODULE AND STYLUS PEN

BACKGROUND

Technical Field

The present disclosure relates to a position indicating module and a stylus pen that are used to input an indicated position on a tablet.

Description of the Related Art

Prior to the present application, the applicant has proposed a position indicator having a coil or an electrode provided in a position indicating portion to obtain a coordinate position on a tablet in Patent Document 1 (Japanese Patent Laid-Open No. 2007-164356). According to this, a position indicator capable of detecting a pen pressure with high accuracy and providing very good operability is realized which includes a variable capacitance capacitor that changes in capacitance according to the pen pressure, and which converts the pen pressure into a digital value and transmits the digital value.

Patent Document 2 (Japanese Patent Laid-Open No. 1993-275283), Patent Document 3 (Japanese Patent Laid-Open No. 2011-186803), and the like disclose variable capacitance capacitors using a dielectric as the variable capacitance capacitor that changes in capacitance according to the pen pressure.

There has recently been an increasing need to use an electrostatic touch panel in combination with a position indicator such as a stylus pen. The use of a stylus pen of an electrostatic type with such a device provides an advantage of being able to simplify the configuration of the tablet. Not only the above-described Patent Document 1 but also Patent Document 4 (Japanese Patent Laid-Open No. 1994-250772), Patent Document 5 (Japanese Patent Laid-Open No. 1995-295722), and the like disclose electrostatic stylus pens.

PATENT DOCUMENTS

Patent Document 1: Japanese Patent Laid-Open No. 2007-164356
Patent Document 2: Japanese Patent Laid-Open No. 1993-275283
Patent Document 3: Japanese Patent Laid-Open No. 2011-186803
Patent Document 4: Japanese Patent Laid-Open No. 1994-250772
Patent Document 5: Japanese Patent Laid-Open No. 1995-295722

SUMMARY

Technical Problems

In the case of an electrostatic stylus pen, an electrode needs to be provided in a pen core, and a connection to the electrode needs to be made. On the other hand, a variable capacitance capacitor as described in Patent Document 2 or Patent Document 3 has a pen core slightly displaced according to a pen pressure. When a connection is to be made to such a part that undergoes displacement, a connecting part affects pen pressure detection, thus presenting problems such as a degradation in pen pressure detection characteristics, inability to perform input by light touch, and the like. In addition, there is for example a problem of being unable to replace the pen core easily even when a pen tip is worn away.

The present disclosure facilitates addressing the above-described problems, and proposes an electrostatic stylus pen capable of detecting a change in a pen pressure applied by a light touch with high accuracy, and a position indicating module used in the electrostatic stylus pen.

In addition to the above, the present disclosure proposes an electrostatic stylus pen from which a pen core including an electrode is detachable.

Technical Solution

In an embodiment, a position indicating module includes: a dielectric having two surfaces opposed to each other; a first electrode disposed on a first surface of the dielectric; a second electrode disposed so as to face a second surface of the dielectric, an area of contact of the second electrode with the second surface being changed by an external force; a core body portion having a third electrode in a tip portion, and transmitting the external force to the second electrode; a first terminal electrically connected to the first electrode; a second terminal electrically connected to the second electrode; and a third terminal electrically connected to the third electrode.

In an embodiment, a conductive portion electrically connected to the third electrode is provided to another end (opposite end from the tip portion) of the core body portion, a core holder formed of a conductive material is provided, and the third electrode and the third terminal are connected to each other by detachably press-fitting the other end of the core body portion into the core holder.

In an embodiment, an electric connection between the core holder and the third terminal is made via a conductive spring.

In an embodiment, the second electrode is formed of an elastic member having conductivity, and the second electrode and the core holder are laminated to both surfaces of a flexible circuit board having flexibility.

In an embodiment, a conductive portion electrically connected to the third electrode is provided to another end (opposite end from the tip portion) of the core body portion, and the conductive portion and the third terminal are connected to each other by a flexible electric wire electrically connected to the conductive portion and extending in a direction perpendicular to an axis of the core body portion.

In an embodiment, an electrostatic stylus pen facilitates replacement of a pen core and can detect a change in a pen pressure applied by a light touch with high accuracy.

BRIEF DESCRIPTION OF DRAWINGS

FIG. 2 is a diagram showing a dielectric, a spacer, and a second electrode in the example of FIG. 1 each being disassembled and arranged.

FIG. 28 is a diagram showing an X-axis whole surface scanning operation.

FIG. 29 is a diagram showing an operation for transition to partial scanning.

FIG. 30 is a diagram showing a partial scanning operation.

DETAILED DESCRIPTION

[First Embodiment]

Figure 1:
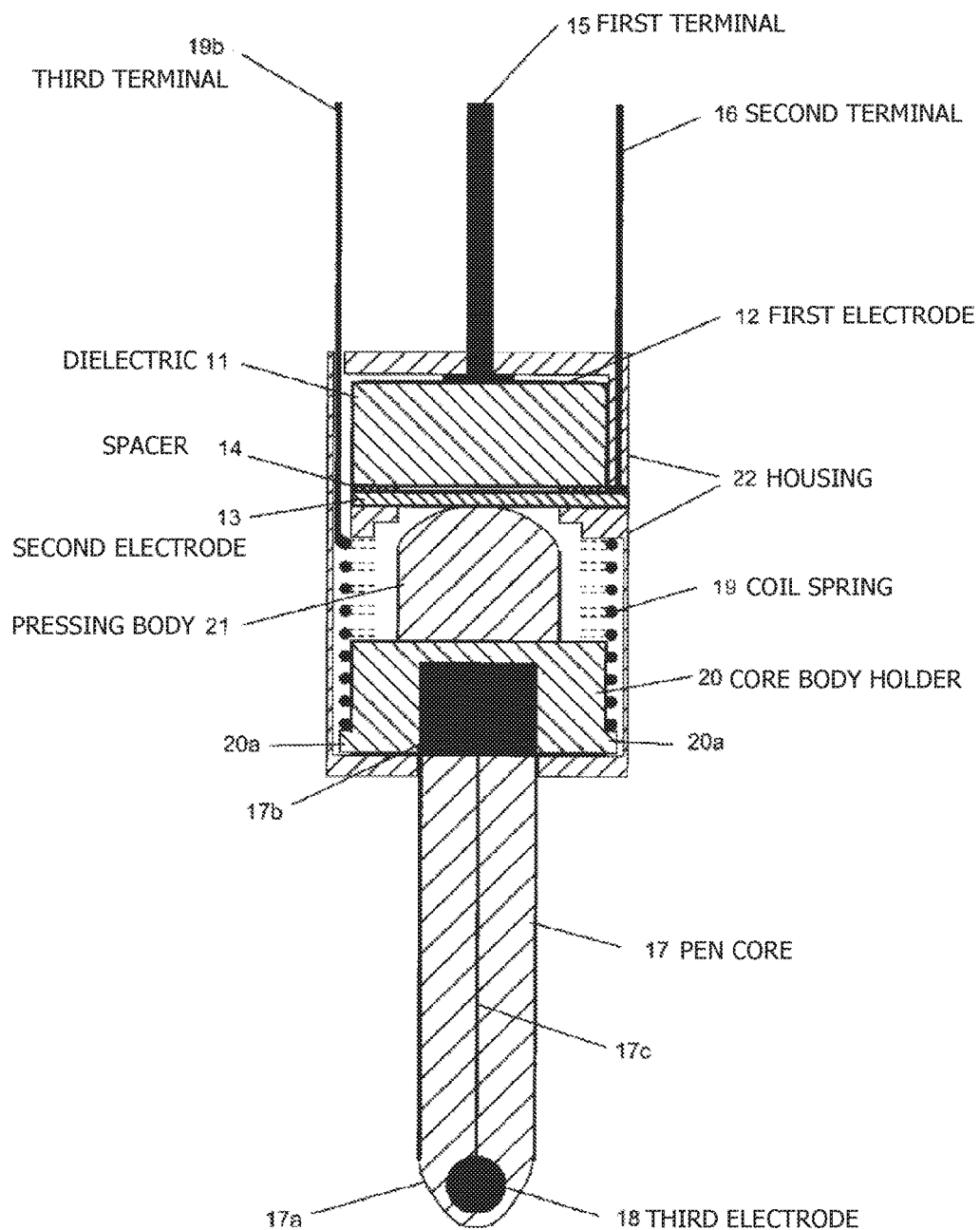
FIG. 1 is a structural diagram of an example of a position indicating module according to a first embodiment.

FIG. 1 is a structural diagram (central sectional view) of an example of a position indicating module according to a first embodiment. In FIG. 1, reference numeral 11 denotes a dielectric substantially in the shape of a disk, reference numeral 12 denotes a first electrode disposed on a first surface of the dielectric 11, and reference numeral 13 denotes a second electrode formed of a flexible material. The second electrode 13 is disposed on the side of a second surface of the dielectric 11 which second surface is opposed to the first surface of the dielectric 11 with a ring-shaped spacer 14 interposed between the second electrode 13 and the second surface. A conductive rubber, for example, can be used as the second electrode 13, or a material obtained by depositing a conductive substance on one surface of a polyimide film may be used as the second electrode 13.

FIG. 2 is a perspective view when the dielectric 11, the spacer 14, and the second electrode 13 are each disassembled and arranged. At least the side of a surface 13*a* of the second electrode 13 which surface is in contact with the spacer 14 has conductivity. The conductive surface is provided with a projecting portion 13*b*.

In FIG. 1, reference numeral 15 denotes a first terminal, which may comprise a metal. The first terminal 15 is electrically connected to the first electrode 12 on the dielectric 11. Reference numeral 16 denotes a second terminal, which may comprise a metal. The second terminal 16 is electrically connected to the second electrode 13.

Figure 3:
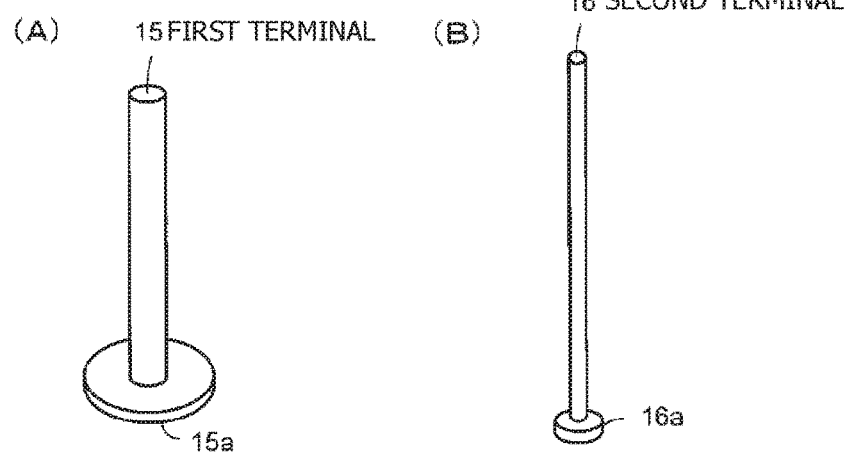
FIG. 3 is a diagram showing external appearances of a first terminal and a second terminal in the example of FIG. 1.

FIG. 3 shows external appearances of the first terminal 15 and the second terminal 16. The first terminal 15 is provided with a flat part 15*a* connected to the first electrode 12. In addition, the second terminal 16 is provided with a flat part 16*a* connected to the projecting portion 13*b* of the second electrode 13.

In FIG. 1, reference numeral 17 denotes a pen core substantially in the shape of a rod, the pen core in the present example being formed of a nonconductor material, for example a resin. In the present example, only the pen core 17 constitutes a core body portion. A third electrode 18 is embedded in a tip 17*a* of the pen core 17. A connecting end 17*b* of the pen core 17, which connecting end is on the opposite side from the tip 17*a*, is coated with a conductive substance. The connecting end 17*b* is electrically connected to the third electrode 18 via a conductor 17*c* provided within the pen core 17.

Figure 4:
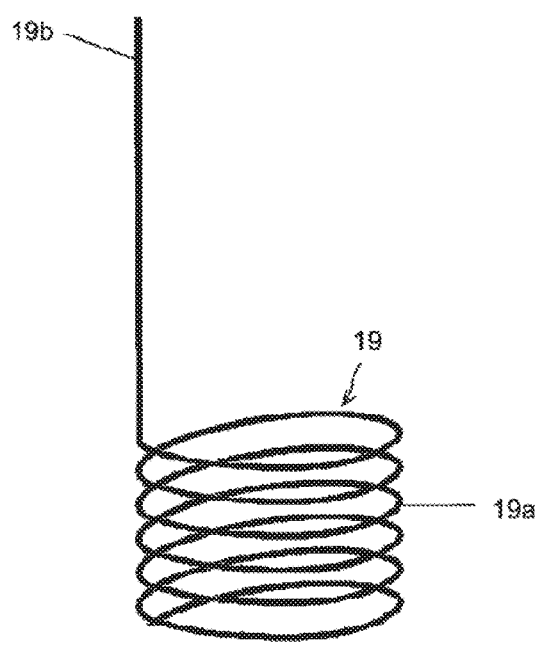
FIG. 4 is an external view of a coil spring in the example of FIG. 1.

Reference numeral 19 denotes a spring formed of a conductive material. The spring in the present example is a coil spring. FIG. 4 shows an external appearance of the coil spring. An elastic winding portion 19*a* and a third terminal 19*b* extending straight are provided.

Reference numeral 20 denotes a core body holder formed of a conductive material. The core body holder 20 has such a size and shape as to fit into the winding portion 19*a* of the coil spring 19. In addition, the coil spring 19 is in contact with and electrically connected to the core body holder 20 by a projecting portion 20*a* projecting in the shape of a flange from an outer circumferential surface of the core body holder 20. The core body holder 20 is provided with a hole into which to insert and fit the connecting end 17*b* of the pen core 17. The connecting end 17*b* of the pen core 17 is press-fitted into the core body holder 20, whereby the core body holder 20 is electrically connected to the connecting end 17*b*.

Reference numeral 21 denotes a pressing body, which may comprise a plastic. One end of the pressing body 21 has a rounded cylindrical shape, and another end of the pressing body 21 has a flat shape. The flat-shaped other end side of the pressing body 21 is bonded to the core body holder 20. The rounded one end side of the pressing body 21 is disposed so as to be in contact with the second electrode 13. An elastic material such as a rubber may be used as the pressing body 21.

Reference numeral 22 denotes a housing, in which the above-described members of the dielectric 11, the first electrode 12, the second electrode 13, the spacer 14, the first terminal 15, the second terminal 16, the pen core 17 including the third electrode 18, the coil spring 19, the core body holder 20, and the pressing body 21 are assembled to form a position indicating module. In order to facilitate incorporation of each member, the housing 22 is disassembled into a plurality of parts not shown in the figures, and is assembled by a method such as press-fitting, bonding, or the like.

The operation of the position indicating module according to the first embodiment will be described. Incidentally, in this first embodiment, the dielectric 11, the first electrode 12, the second electrode 13, and the spacer 14 constitute a variable capacitance capacitor. The variable capacitance capacitor is an example of a configuration of a pen pressure detecting unit.

In a state in which no pen pressure is applied to the pen core 17, the dielectric 11 and the second electrode 13 are not in contact with each other due to the spacer 14. When a pen pressure is applied to the pen core 17, the pressing body 21 displaces the second electrode 13, so that the second electrode 13 comes into contact with the second surface of the dielectric 11. The area of the contact changes according to the magnitude of the pen pressure applied to the pen core 17. Thus, a capacitance between the first terminal 15 and the second terminal 16 changes according to the magnitude of the pen pressure applied to the pen core 17.

On the other hand, the third electrode 18 provided in the pen core 17 is electrically connected to the third terminal 19b via the core body holder 20 and the coil spring 19 irrespective of the presence or absence of a pen pressure.

In the position indicating module according to the first embodiment, the coil spring 19 is used both as a part acting to return the pen core 17 when a pen pressure disappears and as a connecting portion connecting the third terminal and the third electrode 18 to each other. Thus, the connecting portion connecting the third terminal and the third electrode 18 to each other does not affect pen pressure detection, and a light load can be detected with high accuracy.

In addition, breaking of a connection line between the third terminal and the third electrode 18 due to repetition of displacement of the pen core 17 may be avoided.

[Second Embodiment (Modification of First Embodiment)]

Figure 5:
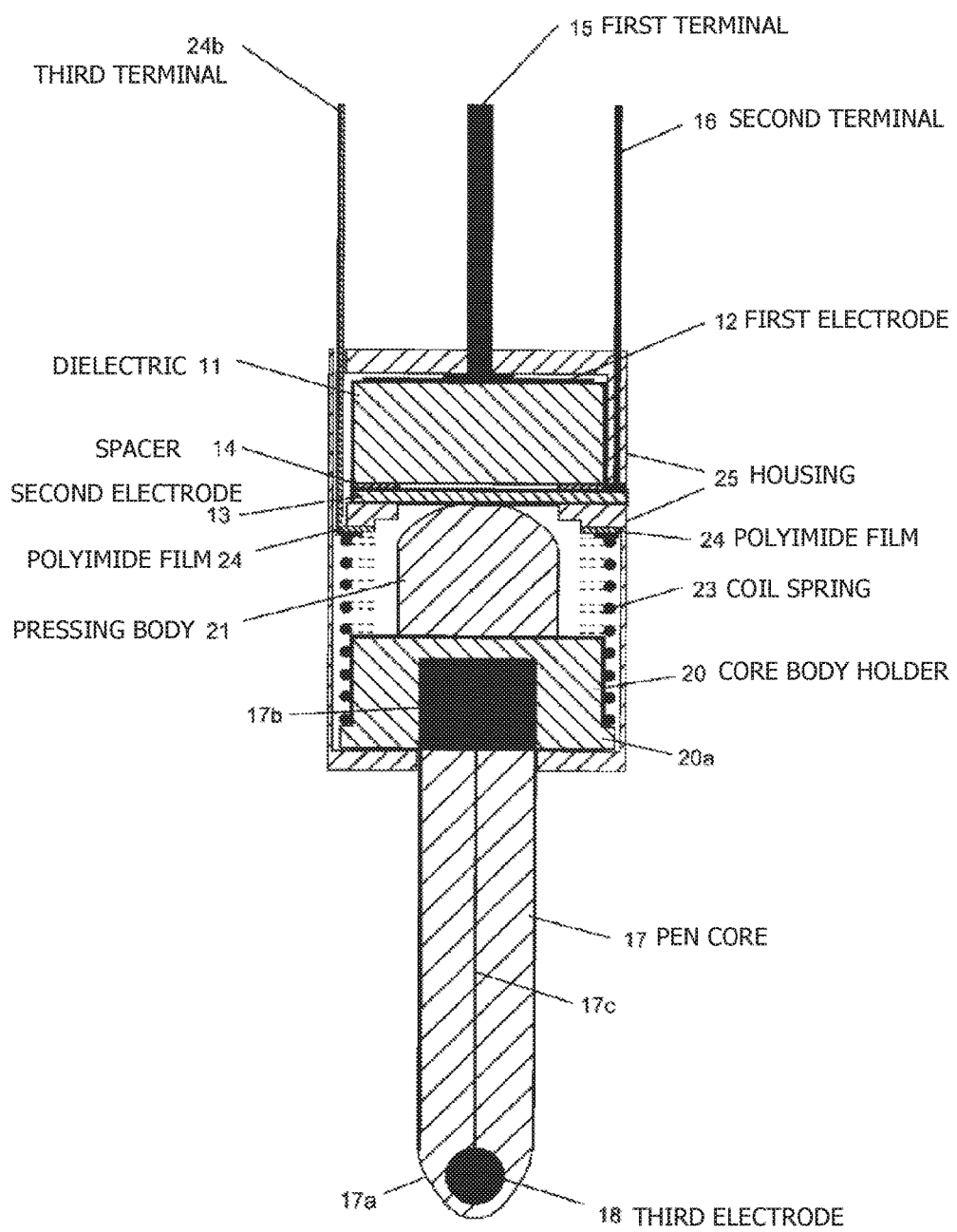
FIG. 5 is a structural diagram of an example of a position indicating module according to a second embodiment.

FIG. 5 is a structural diagram (central sectional view) of an example of a position indicating module according to a second embodiment. The same configurations as those of the position indicating module according to the first embodiment shown in FIG. 1 are identified by the same reference symbols. The second embodiment has many commonalities with the first embodiment. The following description will therefore be made only of parts different from those of FIG. 1.

Reference numeral 23 denotes a coil spring formed of a conductive material. The coil spring 23 is substantially the same as the coil spring 19 shown in FIG. 4, the coil spring 19 being used in the first embodiment. However, the coil spring 23 does not have a part corresponding to the terminal 19b, which is a part extending straight. As with the coil spring 19 in the first embodiment, the coil spring 23 is inserted into a core body holder 20, and brought into contact with a projecting portion 20a. The coil spring 23 is thus electrically connected to the core body holder 20.

Figure 6:
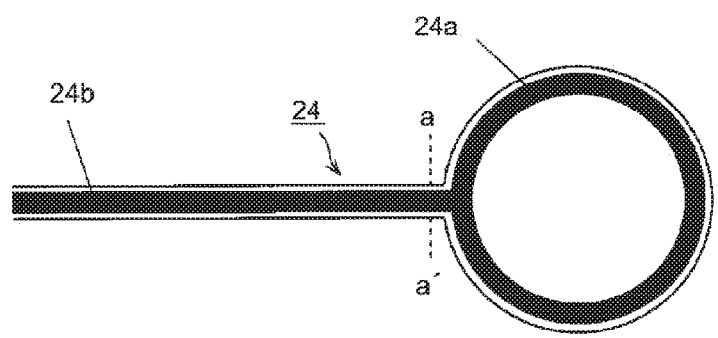
FIG. 6 is a developed view of a polyimide film in the example of FIG. 5.

Reference numeral 24 denotes a flexible substrate, as illustrated a polyimide film. FIG. 6 is a developed view of the polyimide film. The polyimide film 24 has a shape formed by coupling a ring-shaped part and a linear part to each other. On one surface of the polyimide film 24, a ring-shaped conductive pattern 24a is formed on the ring-shaped part by etching or the like, and a linear conductive pattern 24b is formed on the linear part by etching or the like, such that the conductive pattern 24a and the conductive pattern 24b are continuous with each other. In addition, the polyimide film 24 is bent at a right angle along a-a' in FIG. 6. The conductive pattern 24a on the ring-shaped part of the polyimide film 24 has a same size as an end surface of the coil spring 23, and is electrically connected to the coil spring 23. The conductive pattern 24b on the linear part projects as a third terminal 24b.

Reference numeral 25 denotes a housing, in which all members are assembled to form a position indicating module as in the first embodiment. In order to facilitate incorporation of each member, the housing 25 is disassembled into a plurality of parts not shown in the figures, and is assembled by a method such as press-fitting, bonding, or the like.

Also in the thus configured second embodiment, a third electrode 18 is electrically connected to the third terminal 24b via the core body holder 20, the coil spring 23, and the polyimide film 24.

Also in the second embodiment, the coil spring 23 is used both as a part acting to return the pen core 17 when a pen pressure disappears and as a connecting portion for connection from the third terminal 24b to the third electrode 18. Thus, the connecting portion for connection from the third terminal 24b to the third electrode 18 does not affect pen pressure detection, and a light load can be detected with high accuracy.

In addition, breaking of a connection line between the third terminal and the third electrode 18 due to repetition of displacement of the pen core 17 may be avoided.

[Third Embodiment]

Figure 7:
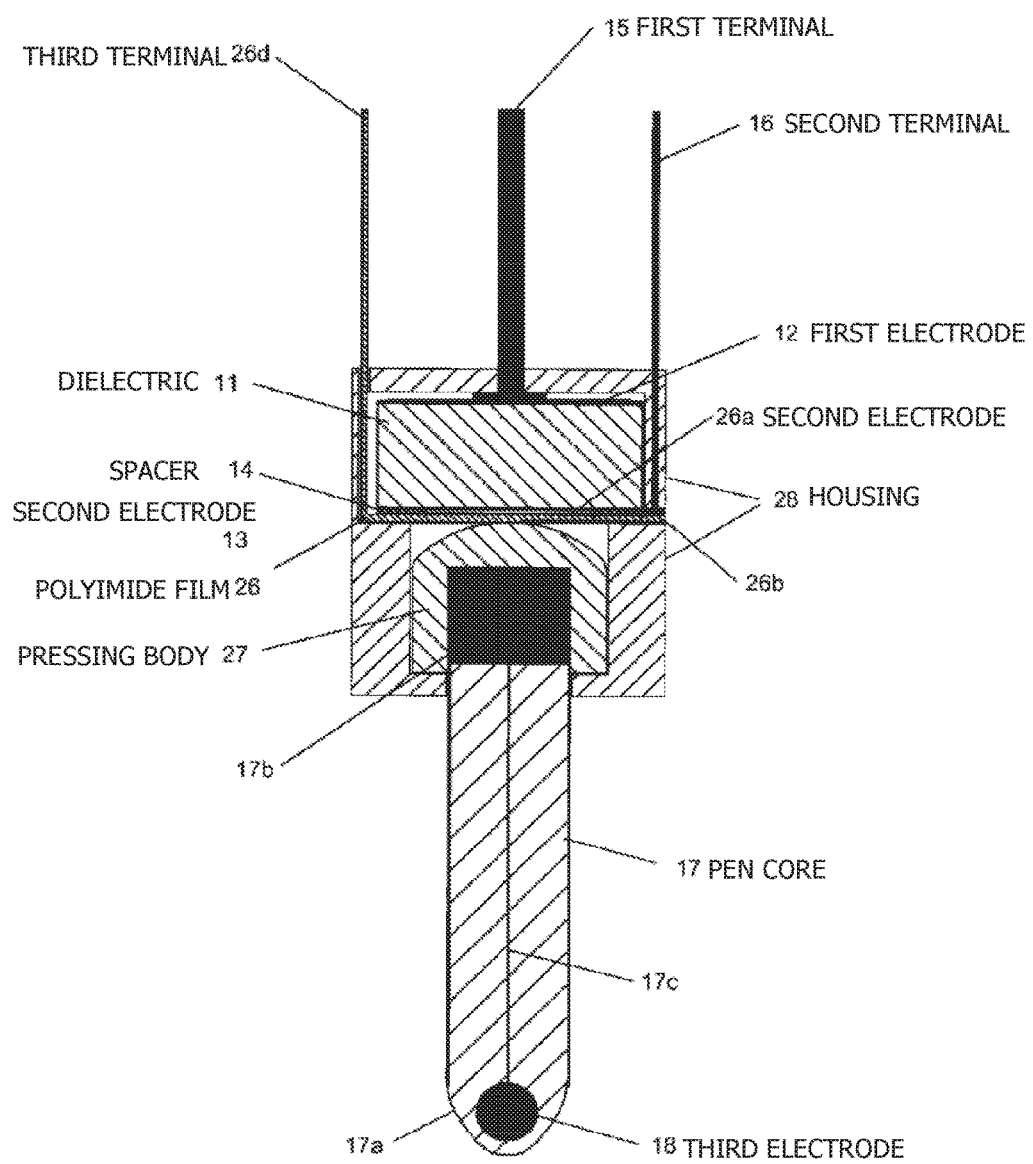
FIG. 7 is a structural diagram of an example of a position indicating module according to a third embodiment.

FIG. 7 is a structural diagram (central sectional view) of an example of a position indicating module according to a third embodiment. The same configurations as those of the position indicating module according to the first embodiment shown in FIG. 1 are identified by the same reference symbols.

Reference numeral 11 denotes a dielectric substantially in the shape of a disk. Reference numeral 12 denotes a first electrode disposed on a first surface of the dielectric 11. Reference numeral 14 denotes a spacer. Reference numeral 15 denotes a first terminal, which may comprise a metal. The first terminal 15 is electrically connected to the first electrode 12 on the dielectric 11. Reference numeral 16 denotes a second terminal, which may comprise a metal. Reference numeral 17 denotes a pen core substantially in the shape of a rod. A third electrode 18 is embedded in a tip 17a of the pen core 17. A connecting end 17b of the pen core 17 is coated with a conductive substance. The connecting end 17b is electrically connected to the third electrode 18 via a conductor 17c provided within the pen core 17. These configurations are the same as in the position indicating module according to the first embodiment.

Figure 8:
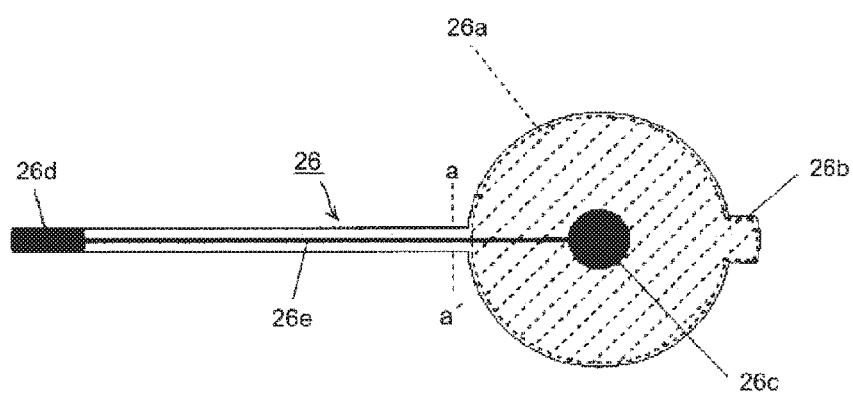
FIG. 8 is a developed view of a polyimide film in the example of FIG. 7.

Reference numeral 26 denotes a flexible substrate, as illustrated a polyimide film. FIG. 8 is a developed view of the polyimide film. The polyimide film 26 has a shape formed by coupling a substantially circular-shaped part and a linear part to each other. A conductive pattern is formed on both surfaces of the polyimide film 26. In addition, the polyimide film 26 is bent at a right angle along a-a' in FIG. 8. A first surface of the substantially circular-shaped part of the polyimide film 26 which first surface is on the side of the dielectric 11 is provided with a second electrode 26a (indicated by broken lines in FIG. 8) formed by positioning a conductive substance on the first surface of the substantially circular-shaped part of the polyimide film. The second electrode 26a is electrically connected to the second terminal 16 at a projecting portion 26b on the substantially circular-shaped part. On a second surface of the polyimide film 26 which second surface is an opposite surface from the first surface of the polyimide film 26, a circular conductive pattern 26c is provided at the center of the substantially circular-shaped part. In addition, a third terminal 26d is provided on an end of the linear part of the second surface of the polyimide film 26. The circular conductive pattern 26c and the third terminal 26d are connected to each other by a thin conductive pattern 26e. These patterns are formed by etching or the like.

Reference numeral 27 denotes a pressing body formed of a conductive elastic material, for example a conductive rubber. One end of the pressing body 27 has a rounded cylindrical shape. Another end of the pressing body 27 is provided with a hole into which the connecting end 17b of the pen core 17 is press-fitted. The shape of a housing 28 to be described later is determined such that the rounded end of the pressing body 27 is in contact with the conductive pattern 26c on the polyimide film 26.

Reference numeral 28 denotes a housing, in which all members are assembled to form a position indicating module as in the first embodiment. In order to facilitate incorporation of each member, the housing 28 is disassembled into a plurality of parts not shown in the figures, and is assembled by a method such as press-fitting, bonding, or the like.

The polyimide film 26 has flexibility, and is therefore in a flat shape in a state in which no pen pressure is applied to the pen core 17. The dielectric 11 and the second electrode 26a are in a state of being not in contact with each other due to the spacer 14. However, when a pen pressure is applied to the pen core 17, the pressing body 27 displaces the second electrode 26a, so that the second electrode 26a comes into contact with the dielectric 11. The area of the contact between the dielectric 11 and the second electrode 26a changes according to the magnitude of the pen pressure applied to the pen core 17. Thus, a capacitance between the first terminal 15 and the second terminal 16 changes according to the magnitude of the pen pressure applied to the pen core 17.

On the other hand, the third electrode 18 provided in the pen core 17 is electrically connected to the third terminal 26d via the pressing body 27 and the conductive pattern 26c on the second surface side of the polyimide film 26.

In the third embodiment, the flexibility of the polyimide film 26 and the elasticity of the pressing body 27 maintain the state in which the pressing body 27 and the conductive pattern 26c on the polyimide film 26 are in contact with each other irrespective of the presence or absence of a pen pressure.

In the third embodiment, the connection between the second terminal 16 and the second electrode 26a is made by the projecting portion 26b on the polyimide film 26. However, the connection may be made via the first surface of the linear part of the polyimide film 26, and the second terminal may be provided on the back side of the third terminal 26d.

[Fourth Embodiment]

Figure 9:
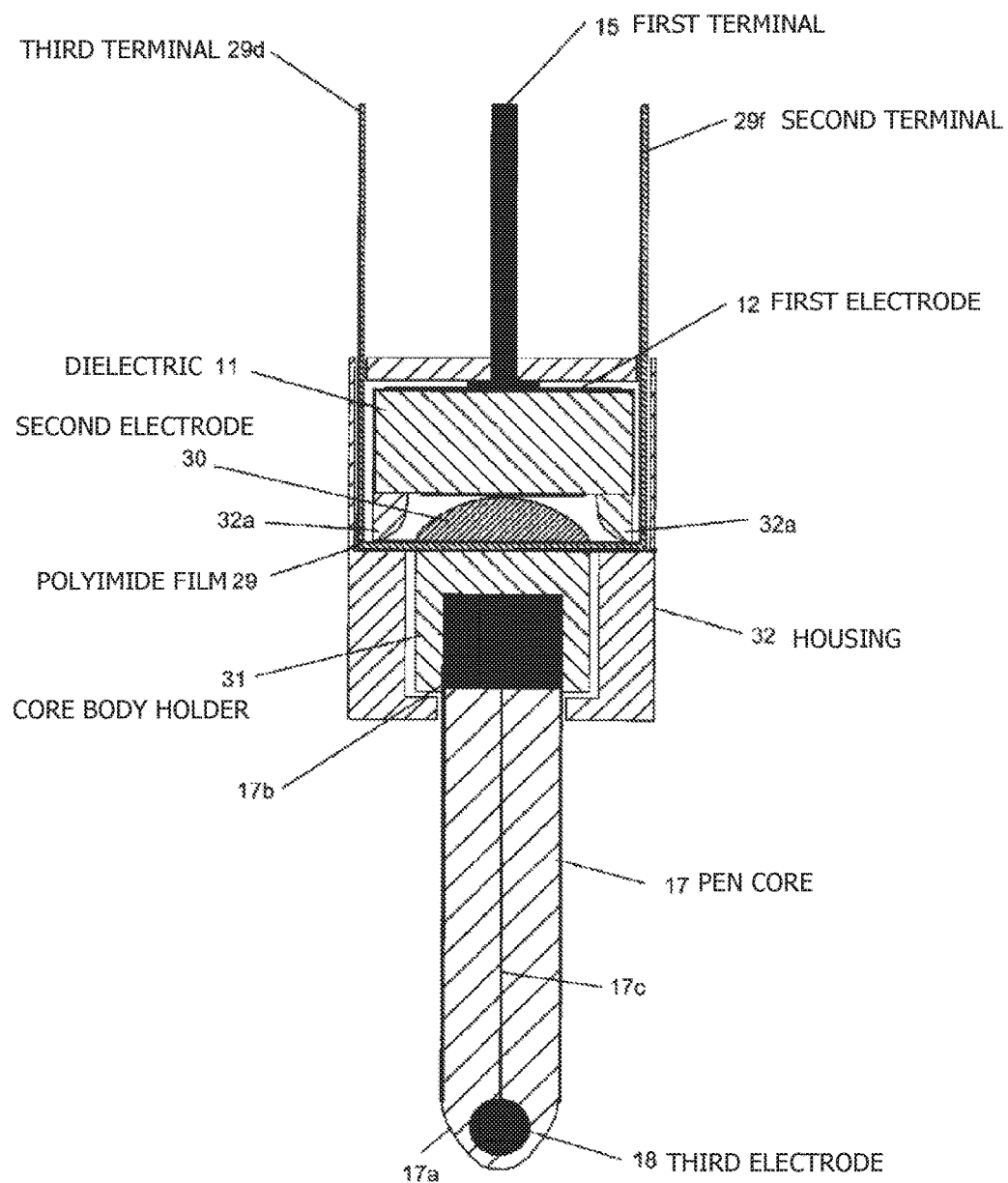
FIG. 9 is a structural diagram of an example of a position indicating module according to a fourth embodiment.

FIG. 9 is a structural diagram (central sectional view) of an example of a position indicating module according to a fourth embodiment. The same configurations as those of the position indicating module according to the first embodiment shown in FIG. 1 are identified by the same reference symbols.

Reference numeral 11 denotes a dielectric substantially in the shape of a disk. Reference numeral 12 denotes a first electrode disposed on a first surface of the dielectric 11. Reference numeral 15 denotes a first terminal, which may comprise a metal. The first terminal 15 is electrically connected to the first electrode 12 on the dielectric 11. Reference numeral 17 denotes a pen core substantially in the shape of a rod. A third electrode 18 is embedded in a tip 17a of the pen core 17. A connecting end 17b of the pen core 17 is coated with a conductive substance. The connecting end 17b is electrically connected to the third electrode 18 via a conductor 17c provided within the pen core 17. These configurations are the same as in the position indicating module according to the first embodiment.

Figure 10:
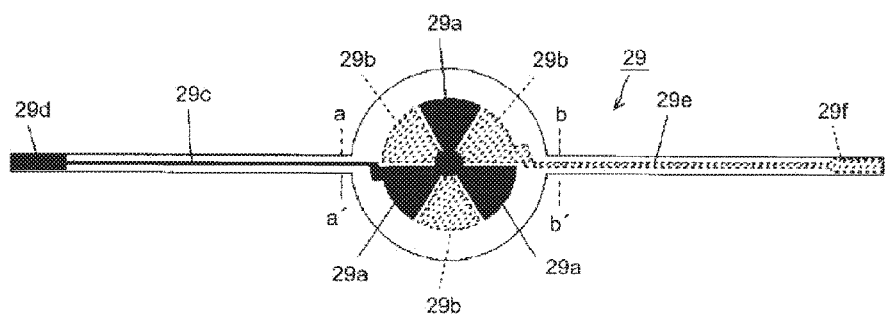
FIG. 10 is a developed view of a polyimide film in the example of FIG. 9.

Reference numeral 29 denotes a flexible substrate, which as illustrated is a polyimide film. FIG. 10 is a developed view of the polyimide film. The polyimide film 29 has a shape formed by coupling a circular-shaped part to two linear parts. Conductive patterns are formed on both surfaces of the polyimide film 29. In addition, the polyimide film 29 is bent at a right angle along each of a-a' and b-b' in FIG. 10. Description will be made supposing that when the polyimide film 29 is fitted as in FIG. 9, a surface of the circular-shaped part which surface faces the pen core 17 is a front surface, and a surface of the circular-shaped part which surface faces the dielectric 11 is a back surface.

FIG. 10 shows, in black, the conductive pattern on the polyimide film 29 as viewed from the front surface, and shows, by dotted lines, the conductive pattern on the back surface of the polyimide film 29. A pattern 29a such that three sectors are coupled to each other by a central portion is formed on the front surface of the circular-shaped part as in FIG. 10. On the back surface of the circular-shaped part, a pattern 29b is formed in a position in which the pattern 29a on the front surface is rotated by 60°. Because the sectorial parts of the pattern 29a thus do not overlap the sectorial parts of the pattern 29b, signals applied to the respective patterns 29a and 29b are prevented from affecting each other.

An end (front surface) of the first linear part of the polyimide film 29 is provided with a third terminal 29d. The third terminal 29d is connected to the pattern 29a via a thin pattern 29c formed on the first linear part of the polyimide film 29. In addition, a second terminal 29f is provided on an end (back surface) of the second linear part of the polyimide film 29. The second terminal 29f is connected to the pattern 29b via a thin pattern 29e formed on the second linear part of the polyimide film 29.

Reference numeral 30 denotes a second electrode formed of a conductive elastic material, for example a conductive rubber. The second electrode 30 has substantially a disk shape substantially equal in diameter to the pattern 29b on the polyimide film 29. One surface of the second electrode 30 is flat, and another surface of the second electrode 30 is convex. The second electrode 30 is bonded to the back surface of the polyimide film 29 by a conductive adhesive, and is thus electrically connected to the pattern 29b.

Reference numeral 31 denotes a core body holder formed of a conductive material and formed in a substantially cylindrical shape. One end of the core body holder 31 is flat, and another end of the core body holder 31 is provided with a hole in which the connecting end 17b of the pen core 17 is press-fitted. The flat surface of the core body holder 31 is bonded to the front surface of the polyimide film 29 by a conductive adhesive, and is thus electrically connected to the pattern 29a.

Reference numeral 32 denotes a housing, in which all members are assembled to form a position indicating module as in the first embodiment. In order to facilitate incorporation of each member, the housing 32 is disassembled into a plurality of parts not shown in the figures, and is assembled by a method such as press-fitting, bonding, or the like.

Incidentally, the periphery of the circular portion of the polyimide film 29 is fixed by the housing 28 from both of the front surface and the back surface. At this time, the back surface side of the polyimide film 29 is held down by a part 32a that comes into circular line contact with the vicinity of the periphery. This is intended to facilitate displacement of the polyimide film 29 when a pen pressure is applied to the pen core 17.

Dimensions of the housing 32 are determined such that a small clearance is left between the second electrode 30 and the dielectric 11 when no pen pressure is applied to the pen core 17.

Also in the thus configured present embodiment, the area of contact between the second electrode 30 and the dielectric 11 changes according to the pen pressure applied to the pen core 17. In addition, the third electrode 18 is connected to the third terminal 29b via the core body holder 31 and the pattern 29a on the polyimide film 29 irrespective of the presence or absence of a pen pressure.

[Fifth Embodiment]

Figure 11:
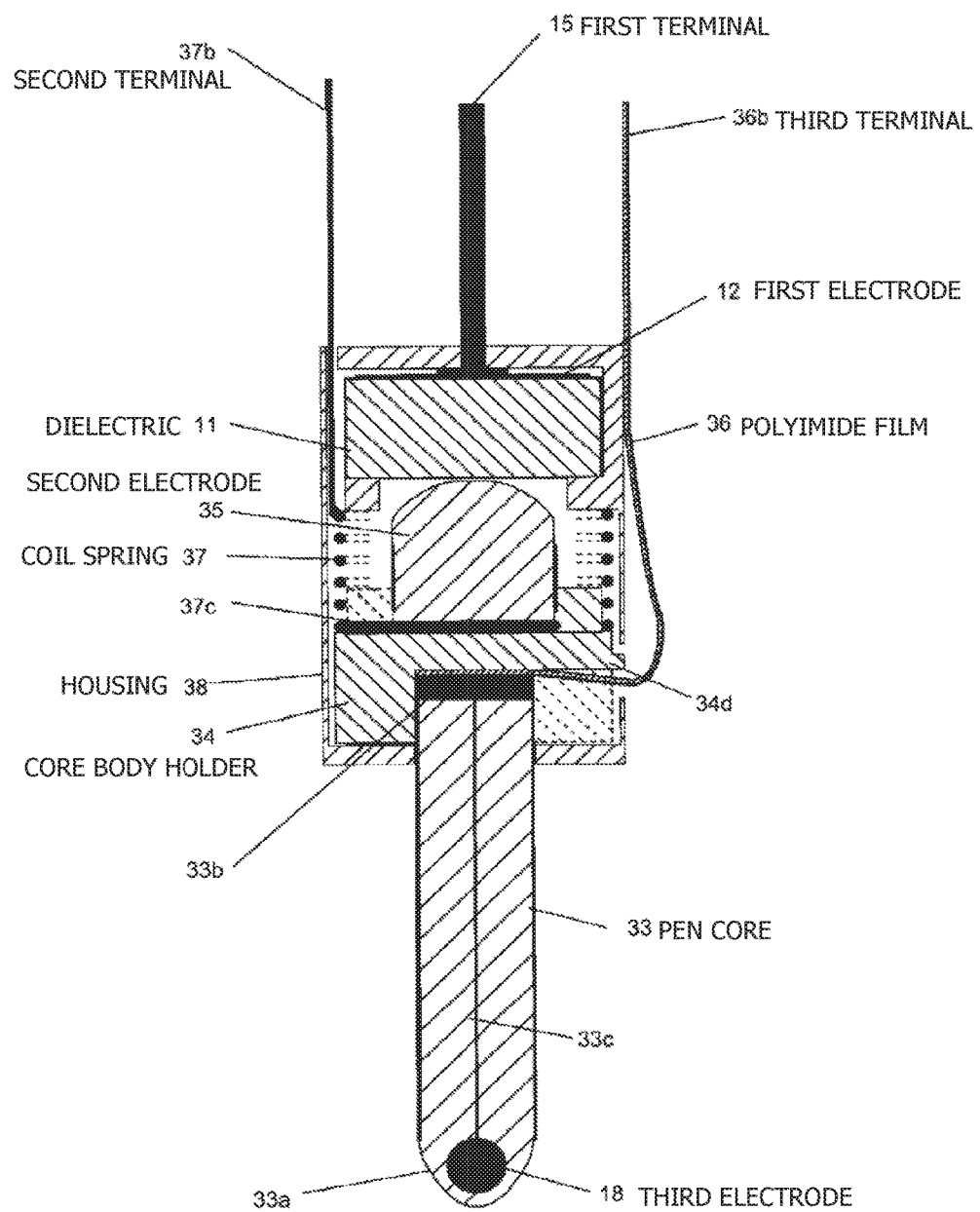
FIG. 11 is a structural diagram of an example of a position indicating module according to a fifth embodiment.

FIG. 11 is a structural diagram (central sectional view) of an example of a position indicating module according to a fifth embodiment. The same configurations as those of the position indicating module according to the first embodiment shown in FIG. 1 are identified by the same reference symbols.

Reference numeral 11 denotes a dielectric substantially in the shape of a disk. Reference numeral 12 denotes a first electrode disposed on a first surface of the dielectric 11. Reference numeral 15 denotes a first terminal, which may comprise a metal. The first terminal 15 is electrically connected to the first electrode 12 on the dielectric 11. Reference numeral 18 denotes a third electrode.

In the present fifth embodiment, an electric connection to the third electrode 18 disposed in a tip of a pen core is made by using a flexible line. In FIG. 11, reference numeral 33 denotes a pen core substantially in the shape of a rod. The pen core 33 is substantially the same as the pen core 17 of the position indicating module according to the first embodiment. Also in the fifth embodiment, the pen core 33 constitutes a core body portion. The third electrode 18 is embedded in a tip 33a of the pen core 33. An end surface of a connecting end 33b of the pen core 33 which connecting end is on an opposite side from the tip 33a is coated with a conductive substance. The connecting end 33b is electrically connected to the third electrode 18 via a conductor 33c provided within the pen core 33.

Figure 12:
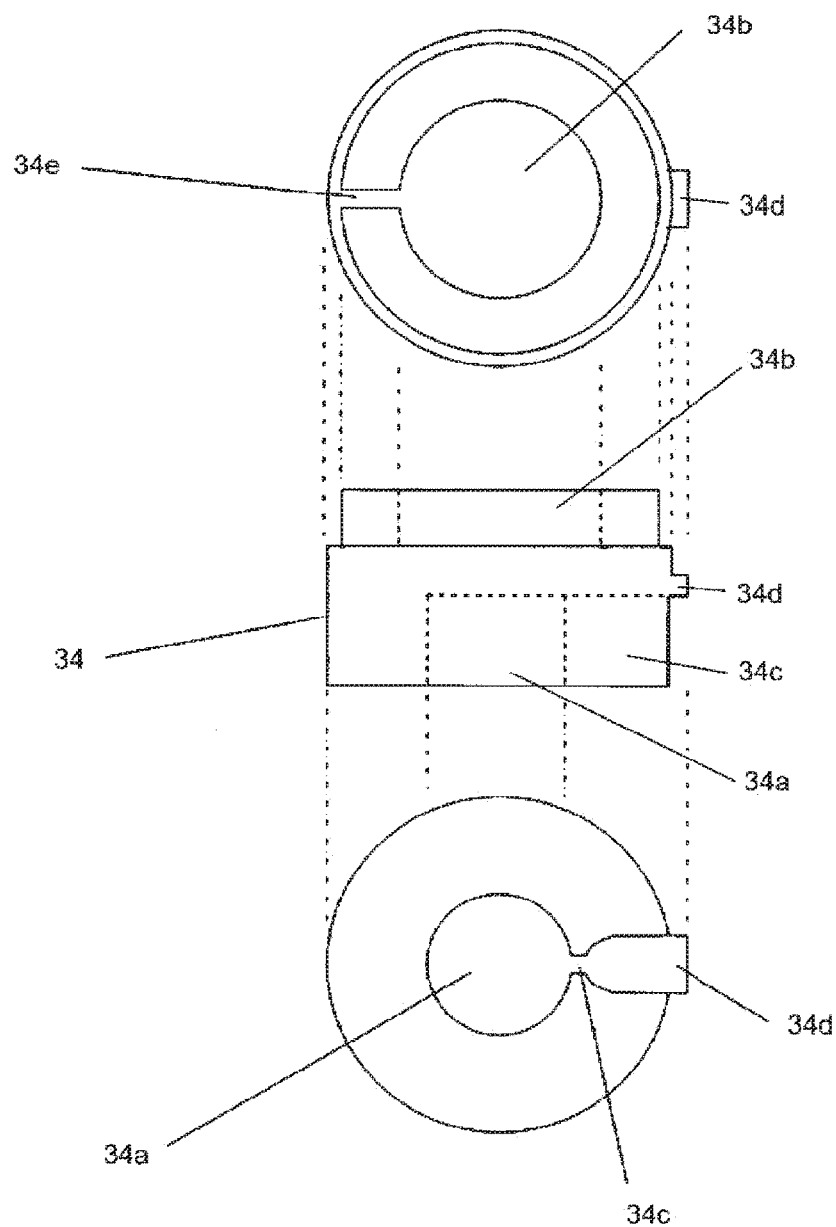
FIG. 12 is a diagram showing the shape of a core body holder in the example of FIG. 11.

Reference numeral 34 denotes a core body holder molded of a plastic. FIG. 12 is a diagram showing the shape of the core body holder 34. Two circular press-fitting portions 34a and 34b are formed in the core body holder 34. The connecting end 33b of the pen core 33 is press-fitted into the press-fitting portion 34a. A second electrode 35 to be described later is press-fitted into the press-fitting portion 34b. A slit 34c is provided to the outer circumference of the press-fitting portion 34a. A projecting portion 34d is provided in the outer circumferential direction of the slit 34c. A bottom portion of the press-fitting portion 34a, a bottom portion of the slit 34c, and the projecting portion 34d form an identical plane for disposing a polyimide film 36 to be described later. A slit 34e is also provided to the outer circumference of the press-fitting portion 34b.

Figure 13:
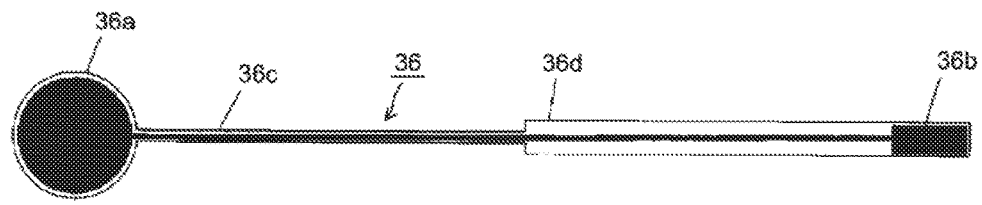
FIG. 13 is a developed view of a polyimide film in the example of FIG. 11.

Reference numeral 36 denotes a flexible substrate, as illustrated a polyimide film. FIG. 13 is a developed view of the polyimide film. A conductive pattern represented by a black part in FIG. 13 is formed on one surface of the polyimide film 36 by etching or the like. A connecting portion 36a is formed as a conductive pattern on a circular-shaped part on one end side of the polyimide film 36. A third terminal 36b is formed as a conductive pattern on a rectangular part on another end side. The connecting portion 36a and the third terminal 36b are electrically connected to each other by a linear pattern 36c on a thin and flexible part of the polyimide film 36. Incidentally, a part of the thin and flexible part of the polyimide film 36 on which thin and flexible part the linear pattern 36c is formed is a slightly wider part 36d, as shown in FIG. 13.

The circular-shaped part of the connecting portion 36a of the polyimide film 36 is bonded to the bottom portion of the press-fitting portion 34a of the core body holder 34. The thin and flexible part on which the linear pattern 36c is formed is fitted so as to extend to the projecting portion 34d through the slit 34c of the core body holder 34.

The connecting end 33b of the pen core 33 is press-fitted into the press-fitting portion 34a of the core body holder 34, whereby the third electrode 18 and the third terminal 36b are electrically connected to each other. The polyimide film 36 is bonded and fixed to the periphery of a housing 38 to be described later by the wide part 36d shown in FIG. 13. Incidentally, a conductive material having elasticity (for example conductive rubber or the like) may be interposed between the connecting end 33b of the pen core 33 and the connecting portion 36a on the polyimide film 36 in order to ensure connection between the connecting end 33b of the pen core 33 and the connecting portion 36a on the polyimide film 36.

Figure 14:
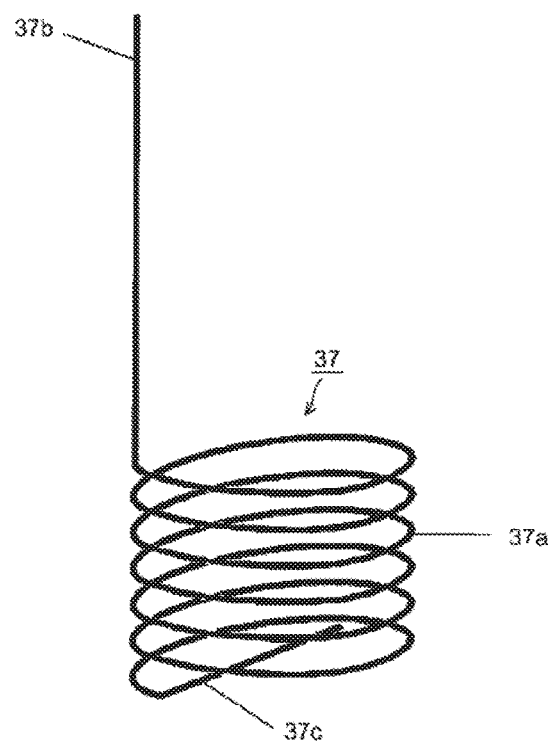
FIG. 14 is an external view of a coil spring in the example of FIG. 11.

Reference numeral 37 denotes a coil spring formed of a conductive material. An external appearance of the coil spring 37 is shown in FIG. 14. The coil spring 37 includes an elastic winding portion 37a and a second terminal 37b extending straight, and includes a connecting portion 37c extending to the inside of the winding portion 37a. The coil spring 37 is fitted to the core body holder 34 such that the connecting portion 37c passes through the slit 34e.

Reference numeral 35 denotes a second electrode formed of a conductive elastic material, for example a conductive rubber, and formed in a cylindrical shape. One end of the second electrode 35 has a rounded dome shape. Another end of the second electrode 35 is press-fitted into the press-fitting portion 34b of the core body holder 34. Press-fitting the second electrode 35 into the press-fitting portion 34b of the core body holder 34 connects the second electrode 35 to the connecting portion 37c of the coil spring 37. The second electrode 35 is thus electrically connected to the second terminal 37b.

Reference numeral 38 denotes a housing, in which all members are assembled to form a position indicating module as in the foregoing embodiments. In order to facilitate incorporation of each member, the housing 38 is disassembled into a plurality of parts not shown in the figures, and is assembled by a method such as press-fitting, bonding, or the like. Incidentally, dimensions of the housing 38 are determined such that a small clearance is left between the dome shape portion of the second electrode 35 and the dielectric 11 when no pen pressure is applied to the pen core 33.

Description will be made of the operation of the thus formed position indicating module according to the fifth embodiment.

In a state in which no pen pressure is applied to the pen core 33, the dielectric 11 and the second electrode 35 are not in contact with each other. When a pen pressure is applied to the pen core 33, the second electrode 35 comes into contact with the dielectric 11. Because the second electrode 35 has elasticity, the area of the contact changes according to the magnitude of the pen pressure applied to the pen core 33.

Incidentally, in the fifth embodiment, the flexible part on which the linear conductor pattern 36c extending from the connecting portion 36a on the polyimide film 36 is formed is in a direction at a right angle to the direction of displacement of the pen core 33. Thus, the elastic force of the polyimide film 36 against the displacement direction is small compared to the elastic force of the coil spring 37. The polyimide film 36 therefore hardly hinders the displacement of the pen core 33.

[First Modification of Fifth Embodiment]

Figure 15:
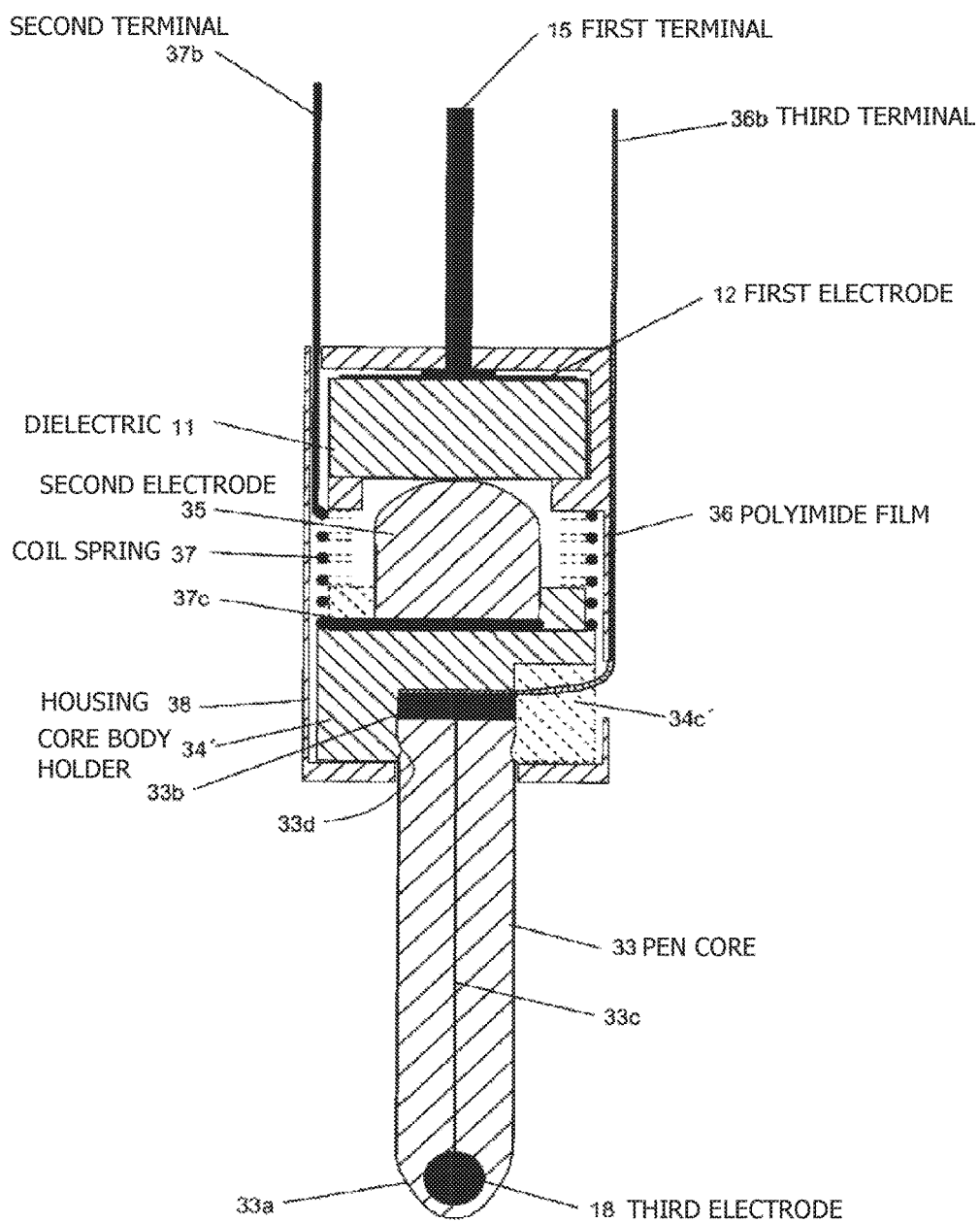
FIG. 15 is a structural diagram of an example of a first modification of the fifth embodiment.

FIG. 15 is a structural diagram (central sectional view) of a modification of the position indicating module according to the fifth embodiment. The same configurations as those of the position indicating module according to the fifth embodiment shown in FIG. 11 are identified by the same reference symbols. This first modification of the fifth embodiment is an example that remedies a problem that the thin and flexible part of the polyimide film 36 may come away from the housing 38 and become loose, as shown in FIG. 11, because of the presence of the projecting portion 34d of the press-fitting portion 34a in the above-described fifth embodiment. A core body holder 34' is used in the first modification of the fifth embodiment.

Figure 16:
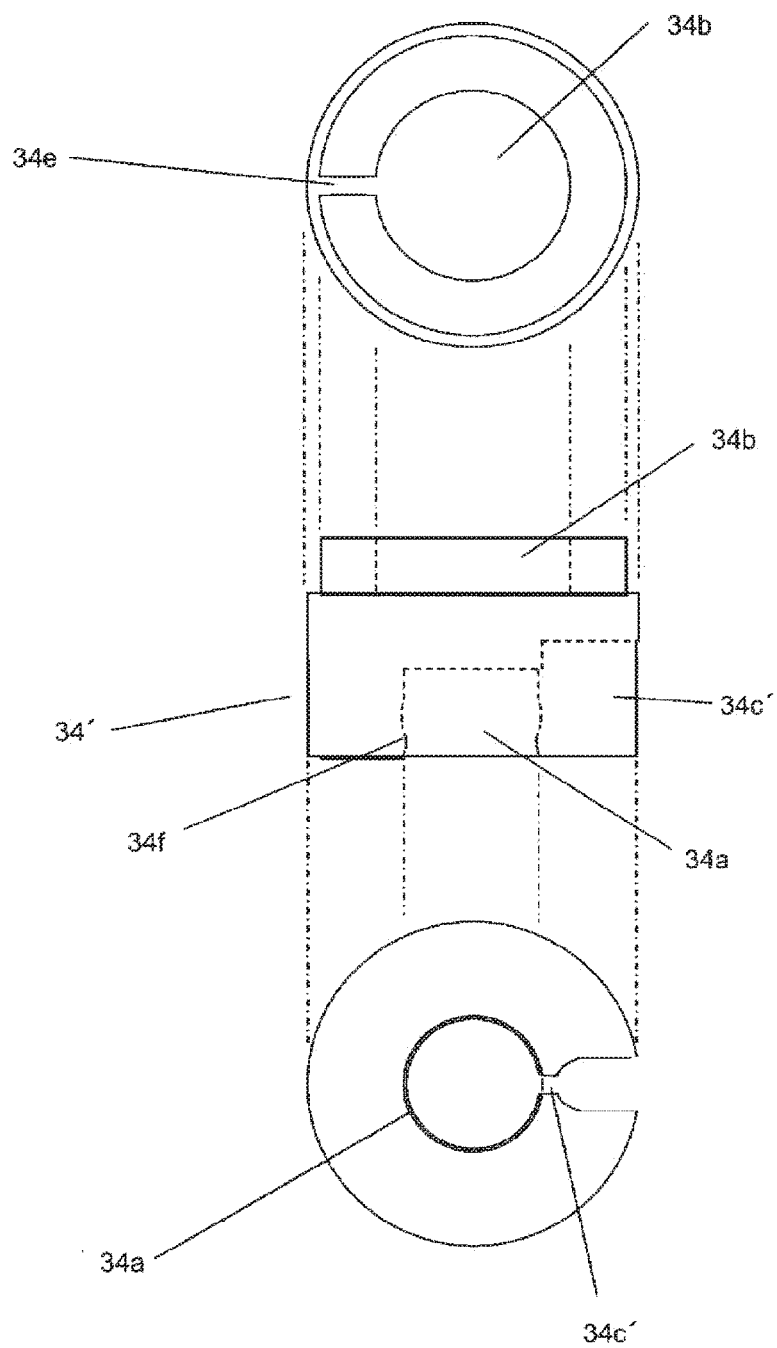
FIG. 16 is a diagram showing the shape of a core body holder in the example of FIG. 15.

FIG. 16 is a diagram showing the shape of the core body holder 34'. A slit 34c' does not have the projecting portion 34d of the core body holder 34 in the fifth embodiment shown in FIG. 12. A bottom portion of the slit 34c' is formed so as to be deeper than a bottom portion of a press-fitting portion 34a, so that a bent portion of a thin and flexible part of a polyimide film 36 is housed within the slit 34c'. Thereby, as shown in FIG. 15, the thin and flexible part of the polyimide film 36 is in close contact with the side surface of a housing 38.

Incidentally, as shown in FIG. 15 and FIG. 16, in the first modification of the fifth embodiment, an uneven portion 34f is formed on the press-fitting portion 34a of the core body holder 34'. An uneven portion 33d having a corresponding shape is formed in a part corresponding to the uneven portion 34f of the press-fitting portion 34a on a connecting end 33b side of a pen core 33. The fitting of the uneven portion 34f and the uneven portion 33d to each other locks the pen core 33, and thus prevents the pen core 33 from being easily detached from the core body holder 34'. Incidentally, the uneven portion 33d is released from the uneven portion 34f by extracting the pen core 33 with force.

[Second Modification of Fifth Embodiment]

In the foregoing fifth embodiment, one electrode 18 is embedded as the third electrode in the tip 33a of the pen core 33. The applicant has proposed detecting an inclination of an axial direction of a stylus pen and an angle of rotation with a direction perpendicular to a tablet surface as an axis in a position detecting device by providing a plurality of electrodes in a pen core. Details of a configuration and operation for detecting an inclination of an axial direction of a stylus pen and an angle of rotation with a direction perpendicular to a tablet surface as an axis are described in detail in a previous application (Japanese Patent Application No. 2012-176102), and therefore description thereof will be omitted in the following.

This second modification of the fifth embodiment represents a case where a pen core provided with a plurality of electrodes is used as a pen core as in the previous application.

Figure 17:
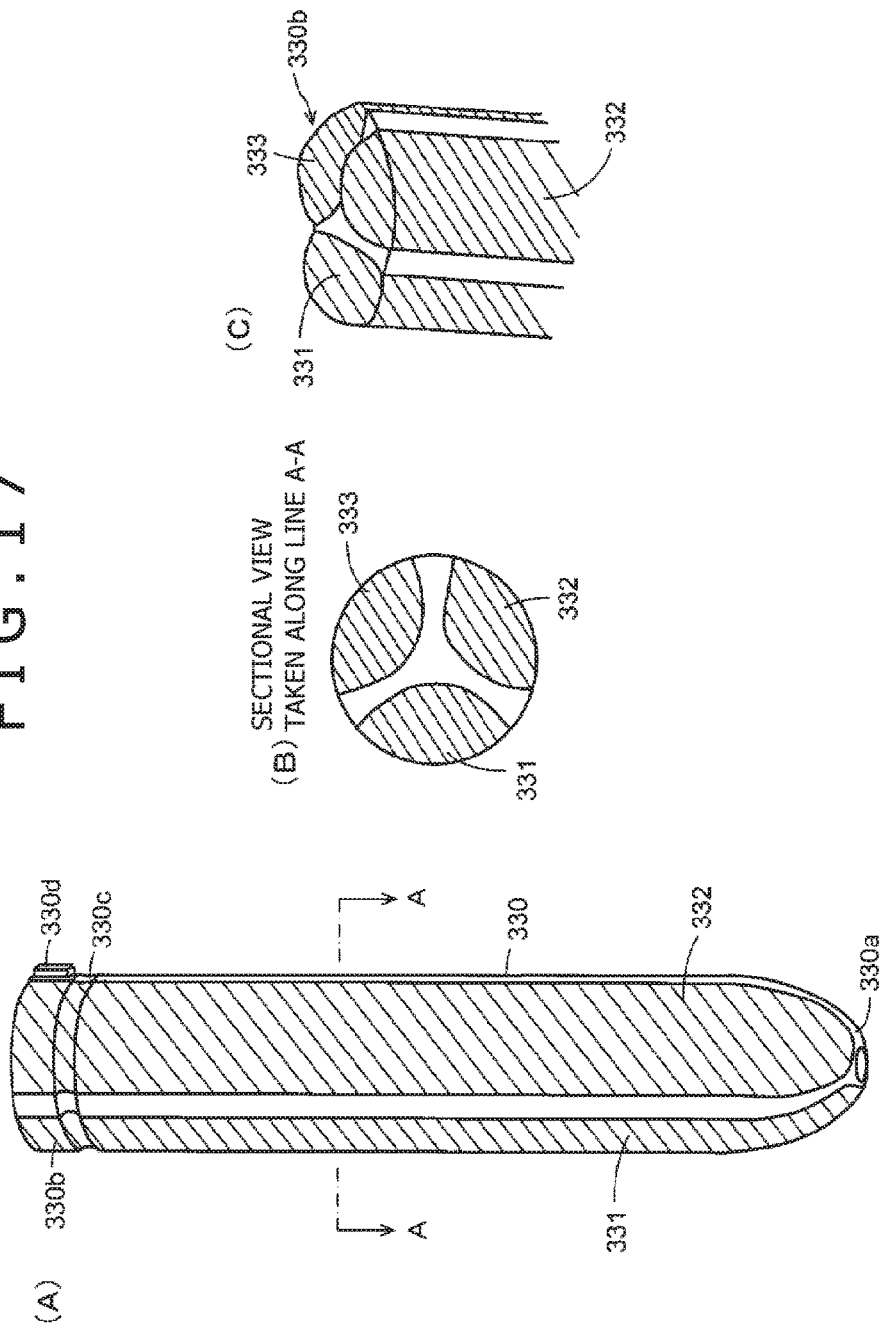
FIG. 17 is a diagram showing a constitution of an example of a pen core used in a second modification of the fifth embodiment.

FIG. 17 is a diagram of assistance in explaining a configuration of a pen core 330 in the second modification of the fifth embodiment. FIG. 17(A) is a perspective view of the pen core 330. FIG. 17(B) is a sectional view of the pen core 330 sectioned along A-A in FIG. 17(A). FIG. 17(C) is a diagram showing the shape of an end surface of a connecting end 330b of the pen core 330 which connecting end is on an opposite side from a tip 330a of the pen core 330.

Specifically, as shown in FIG. 17(A), the pen core 330 in the present example has substantially a rod shape, and includes three electrodes 331, 332, and 333. As shown in FIG. 17, the three electrodes 331, 332, and 333 are formed in a state of being not electrically connected to each other in an axial direction extending from the tip 330a to the connecting end 330b. Parts of the three electrodes 331, 332, and 333 which parts are exposed at the connecting end 330b of the pen core 330 are formed so as to swell out to the outside as shown in FIG. 17(C) in order to be able to facilitate connection of the parts to a flexible substrate, as illustrated a polyimide film 360 to be described later.

The polyimide film 360 according to the second modification of the fifth embodiment is formed as shown in FIG. 18(A). Specifically, a circular-shaped part on one end side of the polyimide film 360 is a connecting portion 360a for connection to the three electrodes 331, 332, and 333 of the pen core 330, and a rectangular part on another end side of the polyimide film 360 is a third terminal portion 360b. Three conductive patterns 361, 362, and 363 to be connected to the respective three electrodes 331, 332, and 333 provided in the pen core 330 are formed on the connecting portion 360a on the one end side of the polyimide film 360. In addition, three terminals 364, 365, and 366 are formed on the third terminal portion 360b on the other end side of the polyimide film 360. The three conductive patterns 361, 362, and 363 on the connecting portion 360a are electrically connected to the three terminals 364, 365, and 366 on the third terminal portion 360b by linear patterns 367, 368, and 369 on a thin and flexible part of the polyimide film 360.

The circular-shaped part of the connecting portion 360a of the polyimide film 360 is bonded to a bottom portion of a press-fitting portion 34a of a core body holder 34', and the thin and flexible part is fitted so as to extend to the outside of a housing 38 through a slit 34c' of the core body holder 34'.

The connecting end 330b of the pen core 330 is press-fitted into the press-fitting portion 34a of the core body holder 34', whereby the electrodes 331, 332, and 333 as the third electrode are electrically connected to the three terminals 364, 365, and 366 on the third terminal portion 360b. The polyimide film 360 is bonded and fixed to the periphery of the housing 38 to be described later by a wide part shown in FIG. 18(A).

Incidentally, as shown in FIG. 17(A), on the connecting end 330b side of the pen core 330, an uneven portion 330c to be fitted to an uneven portion 34f at a time of insertion into the press-fitting portion 34b of the core body holder 34' is formed, and a projecting portion 330d for positioning the pen core 330 in a circumferential direction is formed. In this case, though not shown in the figures, a groove to be fitted to the projecting portion 330d is formed at a determined position in the circumferential direction of the press-fitting portion 34a of the core body holder 34'. The fitting of the projecting portion 330d into the groove uniquely determines the circumferential position of the pen core 330. The electrodes 331, 332, and 333 as the third electrode are thereby electrically connected to the three conductive patterns 361, 362, and 363 on the connecting portion 360a of the polyimide film 360 in determined relation.

FIG. 18(B) is a diagram showing another example of a polyimide film used in the second modification of the fifth embodiment. Specifically, as shown in FIG. 18(B), a connecting portion 360c, which is formed by a circular part, and on which three electrodes 361A, 362A, and 363A as a third electrode are formed, is provided in substantially a central portion in a longitudinal direction of a polyimide film 360A in the present example. Third terminal portions are separated into two parts, which are provided on both sides of the connecting portion 360c.

Figure 18:
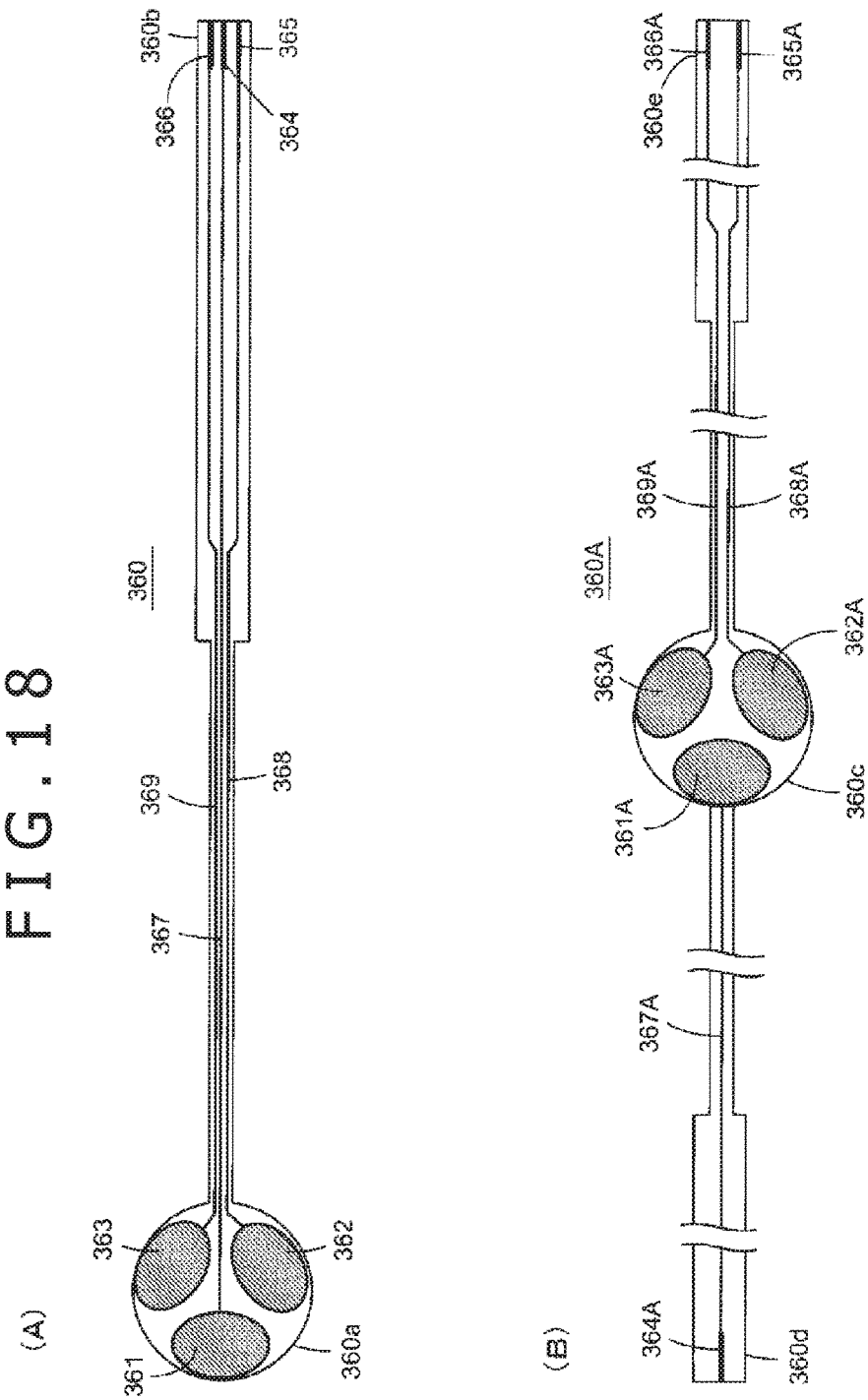
FIG. 18 is a developed view of a polyimide film used in the second modification of the fifth embodiment.

In the example of FIG. 18, a third terminal part 360d on which a terminal 364A of three terminals of third terminal portions is formed is provided on the left side of the connecting portion 360c, and a third terminal part 360e on which a terminal 365A and a terminal 366A of the three terminals of the third terminal portions are formed is provided on the right side of the connecting portion 360c. The conductive pattern 361A on the connecting portion 360c is electrically connected to the terminal 364A via a linear pattern 367A. The conductive patterns 362A and 363A on the connecting portion 360c are electrically connected to the terminals 365A and 366A via linear patterns 368A and 369A.

In the case of using the polyimide film 360A in the example shown in FIG. 18(B), the third terminal portions are divided into the two third terminal parts 360d and 360e, as described above. Therefore, though not shown in the figures, the core body holder 34' is provided with a groove portion leading out the third terminal part 360d to the outside and a groove portion leading out the third terminal part 360e.

It is to be noted that while description has been made of a case where the second modification of the fifth embodiment shown in FIG. 18 is applied to the first modification of the fifth embodiment, the second modification of the fifth embodiment shown in FIG. 18 can of course be applied to the fifth embodiment shown in FIG. 11.

[Sixth Embodiment]

Figure 19:
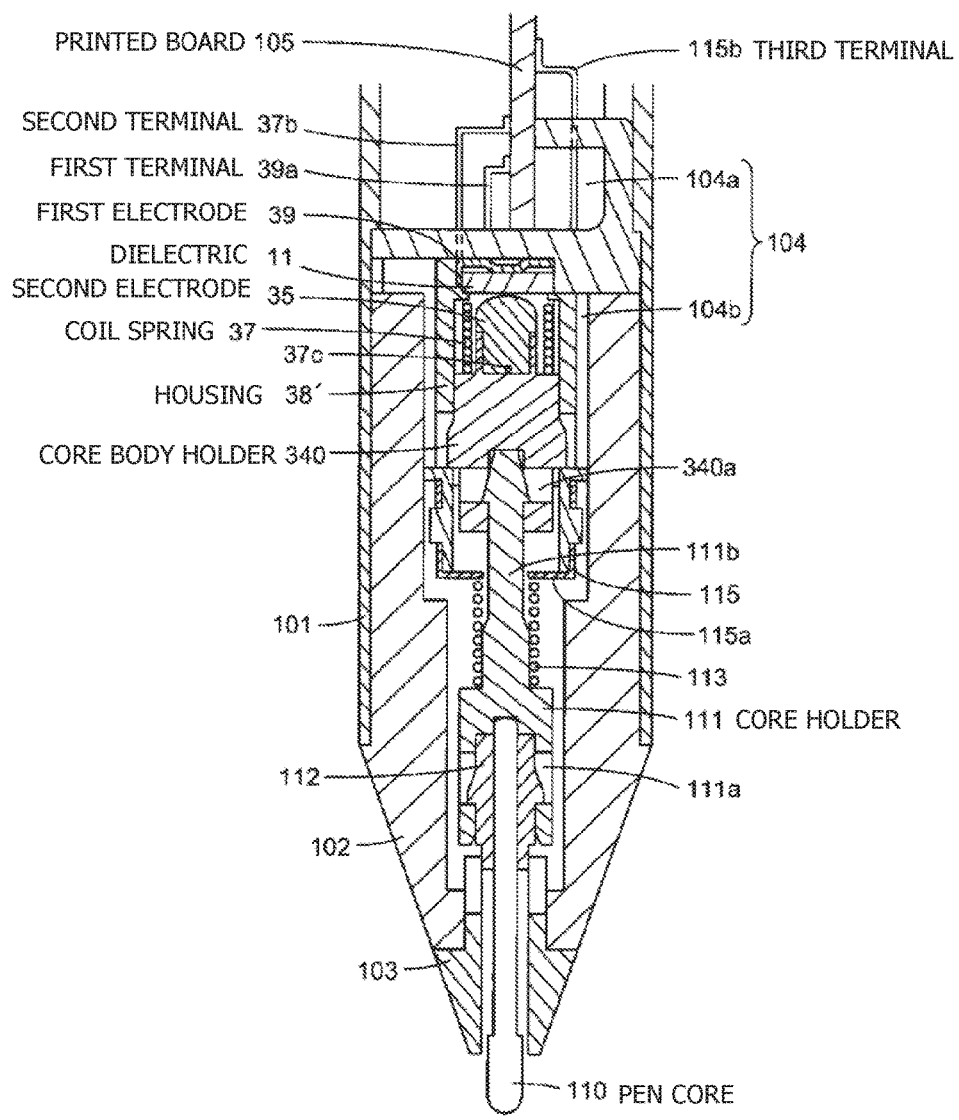
FIG. 19 is a structural diagram of an example of a portion of a position indicator including a position indicating module according to a sixth embodiment.

FIG. 19 is a sectional view of a part of a position indicator (electronic pen) including a position indicating module according to a sixth embodiment. The same configurations as those of the position indicating module according to the foregoing fifth embodiment are identified by the same reference symbols.

Pen pressure detecting means according to the sixth embodiment is configured as a variable capacitance capacitor as in the fifth embodiment. Reference numeral 11 denotes a dielectric substantially in the shape of a disk. Reference numeral 35 denotes a second electrode formed of a conductive elastic material. Reference numeral 37 denotes a coil spring formed of a conductive material. The coil spring 37 has a second terminal 37b, and has a connecting portion 37c connected to the second electrode 35.

Reference numeral 39 denotes a first electrode comprising a conductive metal. The first electrode 39 is provided so as to be in pressure contact with a first surface of the dielectric 11. A first terminal 39a integral with the first electrode 39 is led out from the first electrode 39.

The second electrode is attached to a core body holder 340 as in the foregoing fifth embodiment. The second electrode 35 fixed to the core body holder 340 is configured to be movable in an axial direction within a housing 38' according to a pen pressure applied to a pen core 110 to be described later. In addition, FIG. 19, reference numeral 101 denotes a case which may be formed of a cylindrical conductive material. Reference numeral 102 denotes a front cap, which may be made of a conductor material formed in a tapered shape. Reference numeral 103 denotes a pen tip guarding member, which may be formed of an insulative material.

A board holder 104 is housed within a hollow portion of the case 101. A printed board 105 is attached to a printed board mounting base portion 104a of the board holder 104. In addition, a position indicating module is retained by a module retaining portion 104b of the board holder 104. Incidentally, a battery not shown in the figure is housed in the case 101.

A configuration of the position indicating module according to the sixth embodiment will be described.

Reference numeral 110 denotes a pen core, which may be formed of a conductive rod-shaped body such as a metal in the present example. Incidentally, the pen core 110 may also be formed of a conductive felt. In the sixth embodiment, the pen core 110 constitutes a third electrode.

Reference numeral 111 denotes a core holder, which has a retaining portion 111a retaining the pen core 110. A conductive elastic member 112 which may be formed of a conductive material having elasticity such for example as a conductive rubber is housed within the retaining portion 111a. The pen core 110 is fitted into the retaining portion 111a via the conductive elastic member 112. The pen core 110 can be extracted from the core holder 111 by being pulled out with force.

In the sixth embodiment, a core body portion is formed with the pen core 110 fitted in the core holder 111. The core holder 111 has a rod-shaped portion 111b fitted into the core body holder 340 on an opposite side of the core holder 111 from the retaining portion 111a retaining the pen core 110. The rod-shaped portion 111b constitutes a transmitting member that transmits an external force (pen pressure) applied to the pen core 110 to the second electrode 35 retained by the core body holder 340.

A fitting portion 340a into which the rod-shaped portion 111b is fitted is formed in the core body holder 340. The rod-shaped portion 111b of the core holder 111 is press-fitted into the fitting portion 340a. A swelling portion is formed in the vicinity of an end portion of the rod-shaped portion 111b. The swelling portion is engaged with the core body holder 340. The core holder 111 is thereby prevented from falling off the core body holder 340.

A coil spring 113 which may be formed of a conductive material such as a conductive metal is fitted to the rod-shaped portion 111b of the core holder 111. The coil spring 113 biases the core holder 111 toward the pen core 110 with respect to the board holder 104.

The housing 38' is provided with a conductor terminal member 115 disposed so as to straddle the housing 38' and extend to the printed board 105 side. The conductor terminal member 115 and the coil spring 113 formed of a conductive material constitute an electric connecting member. An electric connection to a circuit member for supplying a signal on the printed board 105 is realized by the electric connecting member.

The conductor terminal member 115 includes: an abutting plate portion 115a that one end of the coil spring 113 abuts against; and a third terminal 115b, which is formed by an extending portion connecting the abutting plate portion 115a to a copper foil part connected to a signal supply terminal of the printed board 105 such that the extending portion straddles the part of the pressure sensing part retaining portion 104b of the board holder 104. A signal from the signal supply terminal of the printed board 105 is supplied to the pen core 110 via the conductor terminal member 115, the coil spring 113, the core holder 111, and the conductive elastic member 112.

[Seventh Embodiment]

In the first to third embodiments described above, a variable capacitance capacitor is formed by the dielectric 11, the first electrode 12, the second electrode 13 or 26*a*, and the spacer 14 each as an individual constituent part forming a pen pressure detecting unit. In addition, in the fourth to sixth embodiments, a variable capacitance capacitor is formed by the dielectric 11, the first electrode 12 or 39, and the second electrode 30 or 35 each as an individual constituent part forming a pen pressure detecting unit. In a seventh embodiment, rather than a plurality of constituent parts as used in the foregoing embodiments, a capacitance type pressure sensing device as one semiconductor device is used as a variable capacitance capacitor forming a pen pressure detecting unit.

Figure 20:
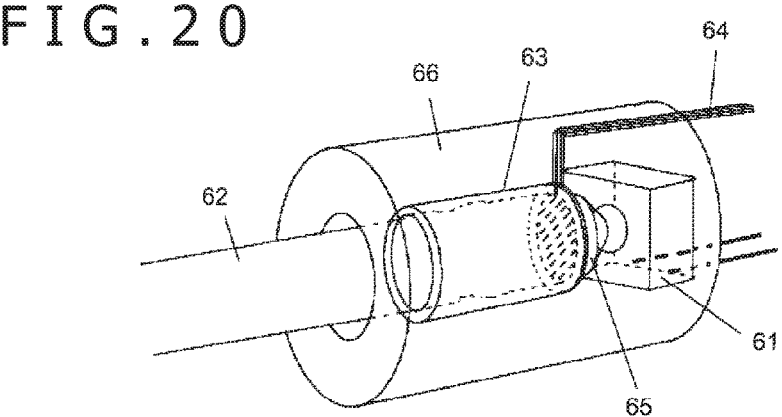
FIG. 20 is a diagram showing an outline of a position indicating module according to a seventh embodiment.
Figure 21:
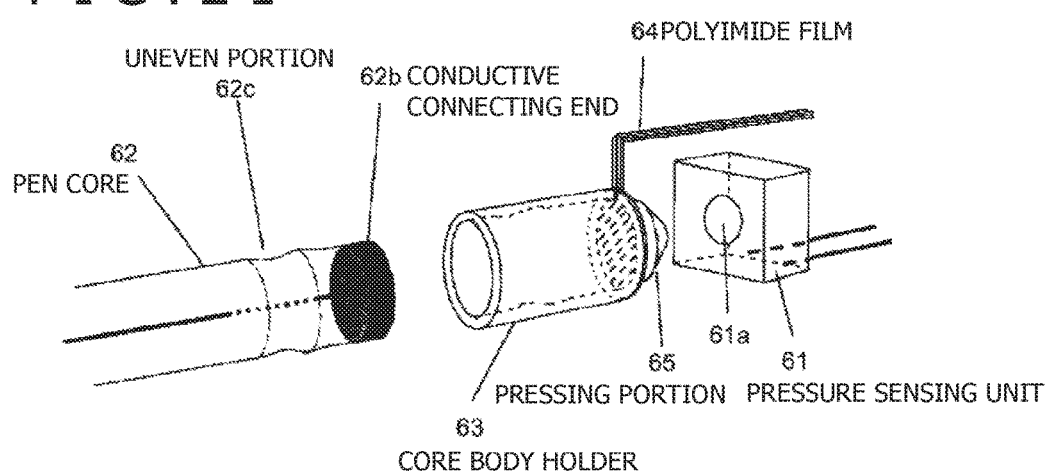
FIG. 21 is an exploded view showing an internal structure in FIG. 20.

FIG. 20 shows an outline of a position indicating module according to the seventh embodiment. FIG. 21 is an exploded view of an internal configuration of the position indicating module according to the seventh embodiment, the position indicating module including a pressure sensing unit 61, a pen core 62, a core body holder 63, a polyimide film 64, and a pressing portion 65. All of these parts 61 to 65 are united within a housing 66, and formed as the position indicating module.

The pressure sensing unit 61 is formed by a MEMS (Micro Electro Mechanical System) sensor, which is an example of a capacitance type pressure sensing device as shown in FIG. 2 of Japanese Patent Laid-Open No. 2013-156066, for example.

This MEMS sensor, an example of which is described in detail in Japanese Patent Laid-Open No. 2013-156066, is a semiconductor device that detects an applied pressure as a change in capacitance. The MEMS sensor has a configuration in which a first electrode configured to bend when receiving an external pressure and a fixed second electrode are arranged so as to be opposed to each other with an air layer (space) as a dielectric interposed between the first electrode and the second electrode. When the MEMS sensor receives an external pressure, the surface of the first electrode bends. Thus, a distance between the first electrode and the second electrode with the air layer interposed therebetween changes, and therefore a capacitance between the first electrode and the second electrode changes. The MEMS sensor is configured to detect the externally applied pressure as a change in this capacitance.

Incidentally, instead of being the MEMS sensor, the pressure sensing unit 61 may be formed by such a unit as is obtained by modularizing a part (the dielectric 11, the first electrode 12, the second electrode 13, and the spacer 14) of the configuration of the position indicating module illustrated in the first embodiment, for example.

The pen core 62 in the present example may be formed of a nonconductor material, for example a resin, substantially in the shape of a rod. In the present example, the pen core 62 constitutes a core body portion. The pen core 62 has a third electrode in a tip not shown in the figure, and has a conductive connecting end 62*b* on an opposite side from the tip. In addition, the pen core 62 in the present example has a slightly uneven portion 62*c* on the conductive connecting end 62*b* side. The core body holder 63 has a hole having a shape into which the uneven portion 62*c* of the pen core 62 is sized and shaped to fit, and has a structure from which the pen core 62 is detachable.

Figure 22:
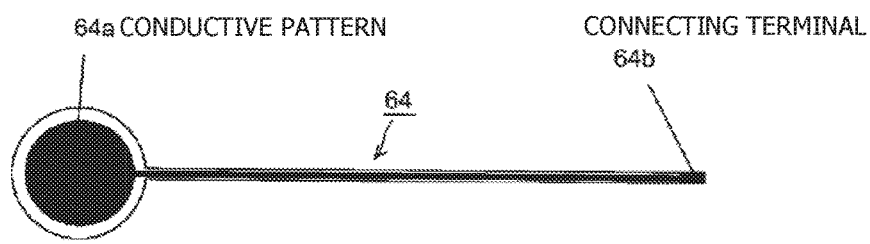
FIG. 22 is a developed view of a polyimide film in the example of FIG. 20.

FIG. 22 is a developed view of the polyimide film 64. A conductive pattern shown in black in FIG. 22 is formed on one surface of the polyimide film 64 by etching or the like. As will be described later, a conductive pattern 64*a* to be connected to the conductive connecting end 62*b* of the pen core 62 is formed on a circular-shaped part on one end side of the polyimide film 64, and a connecting terminal 64*b* is formed as a conductive pattern on a rectangular part on another end side of the polyimide film 64.

Then, the conductive pattern 64*a* side of the polyimide film 64 is bonded to the core body holder 63. Thus, when the pen core 62 is inserted into the core body holder 63, the conductive connecting end 62*b* of the pen core 62 is electrically connected to the conductive pattern 64*a* on the polyimide film 64. The electric connection to the conductive pattern 64*a* on the polyimide film 64 may be ensured by attaching an elastic conductive material such as a conductive rubber to a contact portion of the conductive connecting end 62*b* of the pen core 62.

The pressing portion 65 is bonded to a side of the polyimide film 64 bonded to the core body holder 63 on which side the conductor pattern 64*a* is not formed. The pressing portion 65 in the present example is formed of a material having an elastic force such as a silicon rubber in a substantially conical shape. A tip of the substantially conical shape of the pressing portion 65 depresses a pressing force application surface 61*a* of the MEMS sensor 61.

Figure 23:
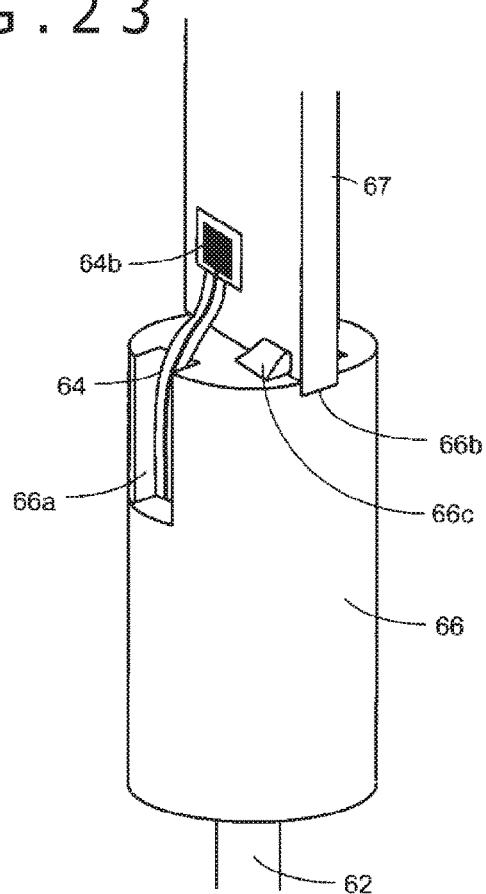
FIG. 23 is a diagram showing an example of a configuration in a case where the position indicating module in the example of FIG. 20 is attached to a printed board.

FIG. 23 is a diagram showing an example of a configuration in a case where the position indicating module according to the seventh embodiment is attached to a printed board 67. A groove 66*a* communicating with the inside of the housing 66 is formed in a part of a peripheral side surface of an end portion of the tubular-shaped housing 66 which end portion is on the printed board 67 side. The polyimide film 64 is housed within the groove 66*a*, and the connecting terminal 64*b* of the polyimide film 64 is led out from the groove 66*a*.

Formed on an end surface of the housing 66 on the printed board 67 side are a recessed portion 66*b* into which an end portion of the printed board 67 is inserted and a pair of projections 66*c* (only one of the pair of projections is shown in FIG. 23) that sandwich the printed board 67 therebetween in a thickness direction. As shown in FIG. 23, the printed board 67 is coupled to the housing 66, and is for example bonded to the housing 66. Then, the connecting terminal 64*b* of the polyimide film 64 which connecting terminal is led out from the housing 66 is for example soldered to the printed board 67, and is thus connected to an electronic circuit provided on the printed board 67.

In the seventh embodiment, when a pen pressure is applied to the pen core 62, the pen pressure is transmitted to the pressing portion 65 via the core body holder 63 to press the pressing force application surface 61*a* of the MEMS sensor 61, and thus the capacitance of the MEMS sensor 61 exhibits a change according to the pen pressure. Hence, the pen pressure can be detected from the change in the capacitance of the MEMS sensor 61.

[Embodiment of Stylus Pen]

Figure 24:
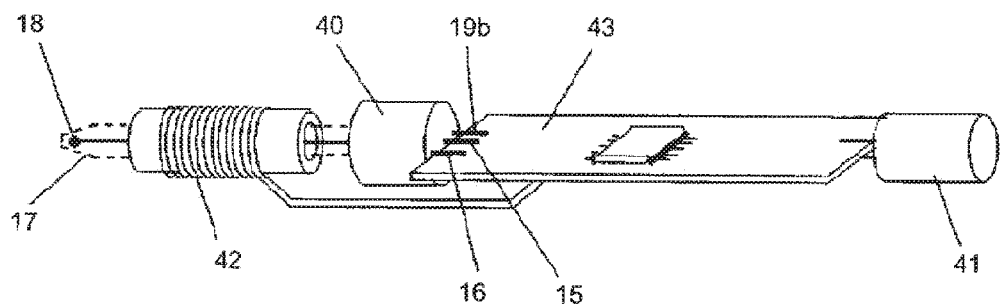
FIG. 24 is a diagram showing an embodiment of a stylus pen.

FIG. 24 shows an example of an internal structure of an embodiment of a stylus pen. In FIG. 24, reference numeral 40 denotes the position indicating module according to the first embodiment shown in FIG. 1. In FIG. 24, the same configurations as those of the first position indicating module shown in FIG. 1 are identified by the same reference symbols. Specifically, reference numeral 15 denotes a first terminal, reference numeral 16 denotes a second terminal, reference numeral 17 denotes a pen core, reference numeral 18 denotes a third electrode, and reference symbol 19b denotes a third terminal.

Reference numeral 41 denotes an electric double layer capacitor that stores power. Reference numeral 42 denotes a coil for charging the electric double layer capacitor 41 in a noncontact manner. The coil 42 is wound around a hollow cylindrical ferrite core, which is disposed such that the pen core 17 passes through the ferrite core. Reference numeral 43 denotes a printed board.

Figure 25:
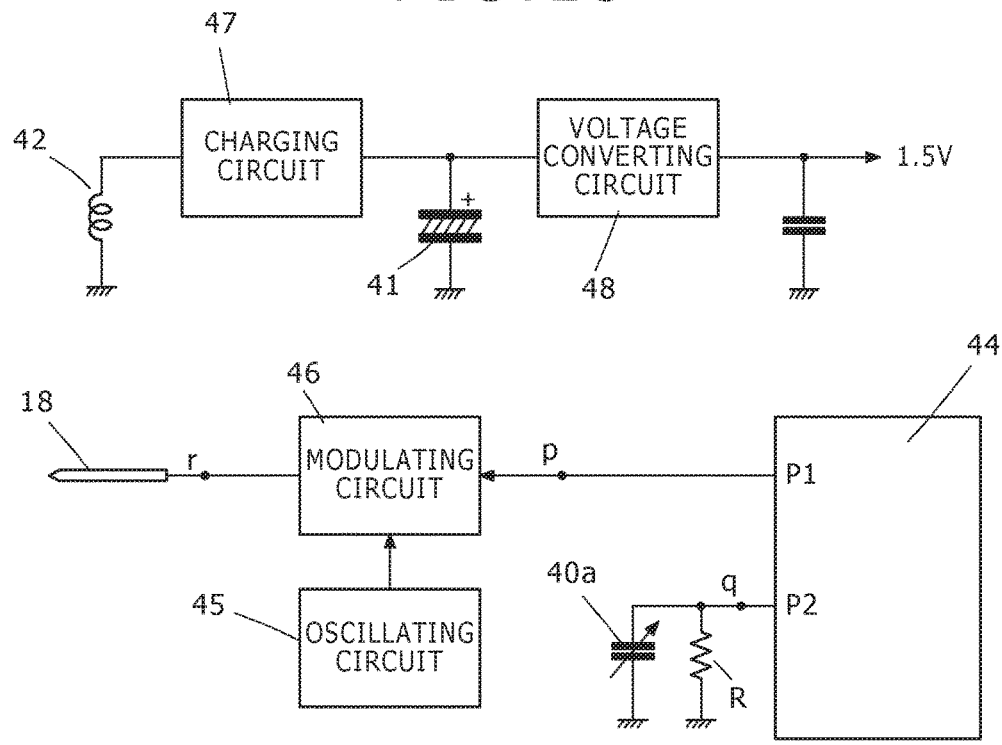
FIG. 25 is a diagram showing an example of a circuit configuration of the embodiment of the stylus pen.

FIG. 25 shows a circuit configuration of the stylus pen shown in FIG. 24. In FIG. 25, the same parts as in FIG. 24 are identified by the same reference symbols. Specifically, reference numeral 18 denotes a third electrode, reference numeral 41 denotes an electric double layer capacitor, and reference numeral 42 denotes a coil for charging the electric double layer capacitor 41 in a noncontact manner.

Reference numeral 44 denotes a microprocessor. Reference numeral 45 denotes an oscillating circuit that generates a signal of a fixed frequency. Reference numeral 46 denotes a modulating circuit, which subjects the signal output from the oscillating circuit 45 to ASK (Amplitude Shift Keying) modulation on the basis of a control signal p from an output terminal P1 of the microprocessor 44. A signal r modulated by the modulating circuit 46 is supplied to the third electrode 18, and is sent out as a signal. In this case, the signal supply from the modulating circuit 46 to the third electrode 18 is performed via the position indicating module 40.

Reference numeral 47 denotes a charging circuit for charging the electric double layer capacitor 41 by a voltage induced in the coil 42. While the coil 42 is disposed around the pen core 17 in the present embodiment, the coil 42 may be disposed at a position different from that of the pen core 17.

Reference numeral 48 denotes a voltage converting circuit, which generates a fixed voltage from a voltage stored in the electric double layer capacitor 41, and supplies the voltage as power for driving each circuit, that is, the microprocessor 44, the oscillating circuit 45, and the modulating circuit 46. Description will be made supposing that the fixed power supply voltage is 1.5 V in the present embodiment.

Reference numeral 40a denotes a variable capacitance capacitor formed by the dielectric 11, the first terminal 15, and the second terminal 16 of the position indicating module 40. A resistance R is connected in parallel with the variable capacitance capacitor 40a. One terminal of the variable capacitance capacitor 40a is connected to an input-output terminal P2 of the microprocessor 44. When the terminal P2 is in an output state, the terminal P2 outputs a high level, so that the variable capacitance capacitor 40a is charged to 1.5 V. When the terminal P2 is in an input state, the terminal P2 is in a high-impedance state. Therefore, a charge stored in the variable capacitance capacitor 40a is slowly discharged via the resistance R connected in parallel, and the voltage of the terminal P2 is gradually lowered. When the terminal P2 is in the input state, the terminal P2 operates as a comparator having a fixed threshold value Vth. Description will be made supposing that the threshold value in the present embodiment is half the power supply voltage, that is, 0.75 V.

Incidentally, in the present embodiment, the frequency of the signal generated by the oscillating circuit 45 is set at about 1.5 MHz to 2.0 MHz. Thereby the signal can be detected by a tablet without a need for such a configuration that a casing not shown in FIG. 24 is electrically grounded and touched by a hand.

Figure 26:
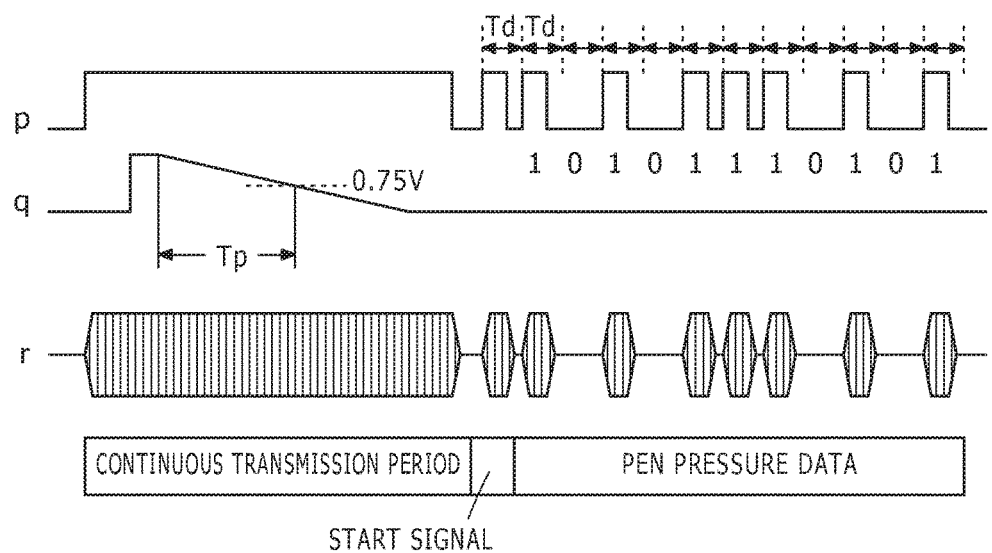
FIG. 26 is a diagram showing operation of the embodiment of the stylus pen.

FIG. 26 shows the operation of the present embodiment, and shows changes in the signals p, q, and r in FIG. 25. The microprocessor 44 performs control such that the terminal P1 (signal p) maintains a high level for a certain period. The signal (r) is thereby emitted from the third electrode 18 continuously during the certain period (see a continuous transmission period in FIG. 26). During this continuous transmission period, the microprocessor 44 controls the terminal P2 to determine a pen pressure applied to the position indicating module 40.

Specifically, the microprocessor 44 charges the variable capacitance capacitor 40a by setting the terminal P2 in an output state. Next, the microprocessor 44 switches the terminal P2 to an input state. At this time, a charge stored in the variable capacitance capacitor 40a is discharged by the resistance R connected in parallel with the variable capacitance capacitor 40a, and therefore the voltage (q) of the variable capacitance capacitor 40a is gradually lowered. A time Tp taken for the voltage q to be lowered to 0.75 V or lower after the terminal P2 is switched to the input state is obtained. This time Tp corresponds to the pen pressure to be obtained. In the present embodiment, the pen pressure is obtained as a value of 11 bits.

After an end of this continuous transmission period, the microprocessor 44 performs ASK modulation by controlling the terminal P1 to a high level or a low level in determined cycles (Td). At this time, a high level is set in the first cycle (start signal in FIG. 26). This is to enable subsequent data sending-out timing to be correctly determined on the tablet side.

The microprocessor 44 sequentially transmits pen pressure data of 11 bits following the start signal. Then, the microprocessor 44 controls the terminal P1 to a low level when transmission data is 0, and controls the terminal P1 to a high level when transmission data is 1. FIG. 26 shows a case where the pen pressure to be transmitted is "10101110101." In the present embodiment, the operation of FIG. 26 is performed repeatedly.

Incidentally, the position indicating module according to the first embodiment (FIG. 1) is used in the stylus pen according to the present embodiment. However, the position indicating modules according to the second to seventh embodiments may be used. In addition, configurations similar to the position indicating modules according to the first to seventh embodiments may be directly formed within the stylus pen.

[Example of Configuration of Tablet]

Figure 27:
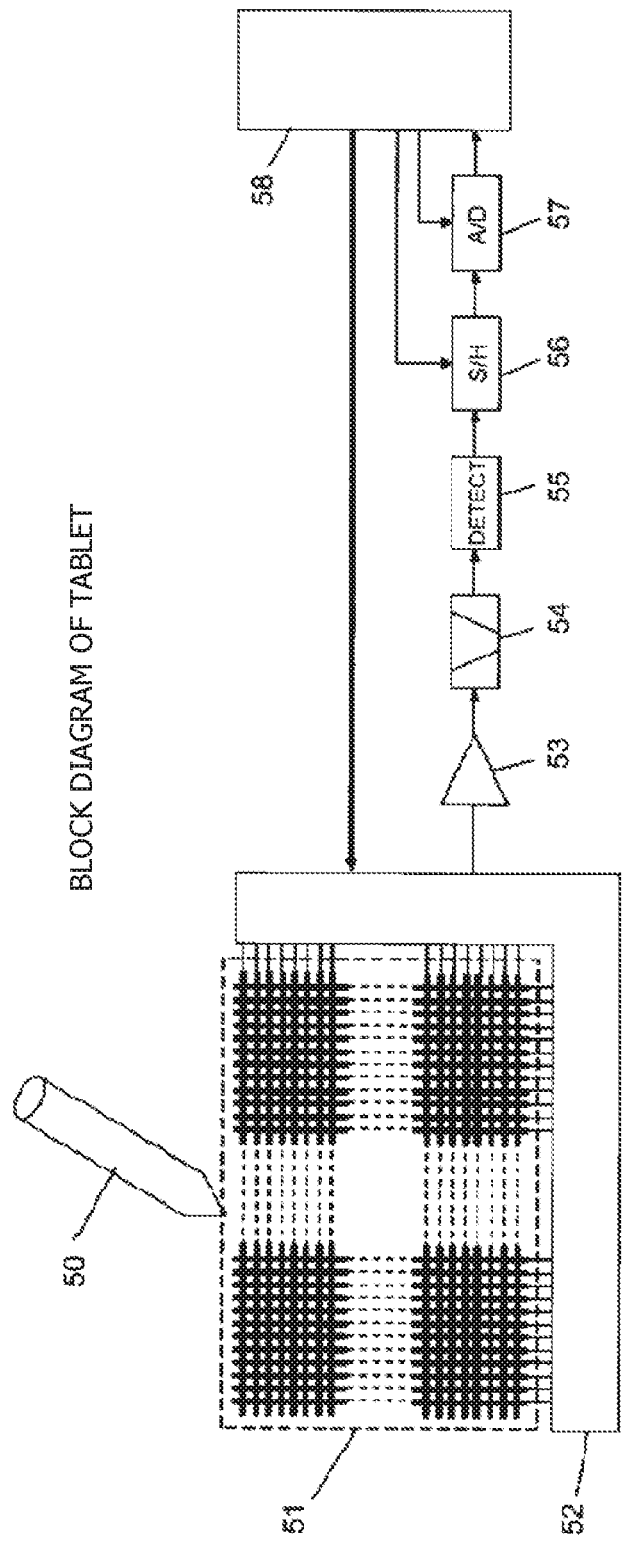
FIG. 27 is a diagram showing an example of a configuration of a tablet used to detect the stylus pen.

FIG. 27 represents an example of a configuration of a tablet used to detect the stylus pen. In FIG. 27, reference numeral 50 denotes the stylus pen shown in FIG. 24 and FIG. 25, and reference numeral 51 denotes a tablet sensor having transparent glass as a base material. The front surface of the tablet sensor 51 is provided with an X-electrode group arranged in an X-direction, and the back surface of the tablet sensor 51 is provided with a Y-electrode group arranged in a Y-direction. The X-electrode group and the Y-electrode group are formed as transparent electrodes of ITO (Indium Tin Oxide; transparent conductive film).

In addition, the tablet sensor 51 is disposed on a display device not shown in the figures, so that a display position on the display device can be directly input by the stylus pen 50. Reference numeral 52 denotes a selecting circuit that selects one electrode from among the X-electrode group and the Y-electrode group. In the present embodiment, description will be made supposing that there are 40 X-electrodes (X1 to X40) and there are 30 Y-electrodes (Y1 to Y30). The electrode selected by the selecting circuit 52 is connected to an amplifying circuit 53. A signal from the stylus pen 50 is detected by the selected electrode, and amplified by the amplifying circuit 53.

The output of the amplifying circuit 53 is supplied to a band-pass filter circuit 54 to extract a component of a frequency transmitted from the stylus pen 50. The output signal of the band-pass filter circuit 54 is detected by a detecting circuit 55. The output signal of the detecting circuit 55 is supplied to a sample and hold circuit 56 to be sampled and held in determined timing, and is thereafter converted into a digital value by an AD (Analog-to-Digital) converting circuit 57. This digital data is read and processed by a microprocessor 58.

The microprocessor 58 internally has a ROM (Read-Only Memory) and a RAM (Random Access Memory), and operates according to a program stored in the ROM to send out respective control signals to the sample and hold circuit 56, the AD converting circuit 57, and the selecting circuit 52.

FIG. 28 shows an X-axis whole surface scanning operation for obtaining an approximate X-direction position of the stylus pen 50 on the tablet sensor 51. The microprocessor 58 sends out a control signal to select the electrode X1 to the selecting circuit 52, and reads data output from the AD converting circuit 57 at the time of selecting the electrode X1 as a signal level. The microprocessor 58 similarly reads signal levels while sequentially changing the selection by the selecting circuit 52 to the electrodes X2, X3, X4, . . . . At this time, when the signal levels detected by all of the electrodes X1 to X40 do not reach a determined value, it is determined that the stylus pen 50 is not on the tablet sensor 51, and the operation of FIG. 28 is repeated. When a signal having a level equal to or more than the determined value is detected from one of the electrodes X1 to X40, the microprocessor 58 stores the number of the X-electrode from which the highest signal level is detected (electrode X11 in FIG. 28).

When determining that the stylus pen 50 is located around the electrode X11, the microprocessor 58 performs an operation for transition to partial scanning as shown in FIG. 29. This operation for transition to partial scanning is an operation for the microprocessor 58 to synchronize timing thereof with the operation of the stylus pen 50 by detecting the time of a start of the period of continuous transmission from the stylus pen 50, and obtain an approximate position of the stylus pen 50 on the Y-axis, when the stylus pen 50 repeats the operation as shown in FIG. 26.

In FIG. 29, the microprocessor 58 sends out a control signal to select the electrode X11 determined in the above-described X-axis whole surface scanning operation to the selecting circuit 52. At this time, a signal corresponding to the signal transmitted from the stylus pen 50 is induced in the electrode X11, and a voltage corresponding to the level of the signal is generated in the detecting circuit 55. The microprocessor 58 reads the signal level by operating the sample and hold circuit 56 and the AD converting circuit 57 in certain cycles. The cycles of operating the sample and hold circuit 56 and the AD converting circuit 57 are each set to be a time sufficiently shorter than a cycle (Td) in which the stylus pen 50 makes transmission in a data transmission period.

When the signal level output by the AD converting circuit 57 has continued to be equal to or more than the determined value for a fixed time (Ts), the microprocessor 58 determines that the continuous transmission period of the stylus pen 50 is started. The microprocessor 58 then makes a transition to a Y-axis whole surface scanning operation (FIG. 29). This time (Ts) is set to be a time sufficiently longer than a cycle (Td) in which the stylus pen 50 makes transmission in a data transmission period.

The microprocessor 58 controls the selecting circuit 52 to sequentially select the electrodes Y1 to Y30, and reads the signal levels from the AD converting circuit 57. At this time, the microprocessor 58 stores an electrode from which a highest signal level is detected. In the present embodiment, description will be made supposing that a highest signal level is detected from the electrode Y20.

After the selecting circuit 52 selects the last electrode Y30, and the detection of the signal level is ended, the microprocessor 58 performs an operation for waiting for an end of the period of continuous transmission from the stylus pen 50. The microprocessor 58 performs control so that the selecting circuit 52 selects the electrode X11. At this time, when the transmission from the stylus pen 50 is continued, a signal having a level equal to or more than the above-described determined value is detected. A time at which the received signal level ceases to reach the determined value is the end time of the continuous transmission from the stylus pen 50. The stylus pen 50 next starts a data transmission period. However, a position of the stylus pen 50 is not determined at this time. Thus, in this case, a transition is made to a partial scanning operation shown in FIG. 30 without data being read.

When the signal level output from the AD converting circuit 57 has continued to be equal to or more than the determined value for a fixed time (Ts) in a state in which the electrode X11 is selected, the microprocessor 58 determines that the continuous transmission period of the stylus pen 50 is started. The microprocessor 58 then makes a transition to a coordinate detecting operation (step 1 in FIG. 30). This time (Ts) is similar to that described with reference to FIG. 29, and is set to be a time sufficiently longer than a cycle (Td) in which the stylus pen 50 makes transmission in a data transmission period.

In order to determine the X-coordinate of the signal from the stylus pen 50, the selecting circuit 52 sequentially selects five electrodes X9 to X13 with the electrode X11 at a center, and the microprocessor 58 operates the AD converting circuit 57 to read the signal levels (step 1). At this time, the number of an electrode detecting a highest signal level (electrode X11 in this case) and the signal level VPX are stored, and the levels detected by the electrodes adjacent to the electrode detecting the highest signal level on both sides are stored as VAX and VBX (step 1).

Next, in order to determine the Y-coordinate of the signal from the stylus pen 50, the selecting circuit 52 sequentially selects five electrodes Y18 to Y22 with the electrode Y20 at a center, and the microprocessor 58 reads the signal levels (step 1). At this time, the number of an electrode detecting a highest signal level (electrode Y20 in this case) and the signal level VPY are stored, and the levels detected by the electrodes adjacent to the electrode detecting the highest signal level on both sides are stored as VAY and VBY (step 1). The signal levels VPX, VAX, VBX, VPY, VAY, and VBY obtained here are used for calculation of coordinate values by calculation equations to be described later.

The microprocessor 58 next performs an operation for waiting for an end of the period of continuous transmission from the stylus pen 50. The microprocessor 58 performs control so that the selecting circuit 52 selects the electrode X11 from which a peak is detected in the above-described coordinate detecting operation. In this case, a time at which the received signal level ceases to reach the determined value is the end time of the continuous transmission from the stylus pen 50 (step 1).

After detecting an end of the continuous transmission from the stylus pen 50, the microprocessor 58 starts an operation of detecting timing of a start signal transmitted prior to pen pressure data (step 2). The microprocessor 58 performs control to repeatedly start the sample and hold circuit 56 and the AD converting circuit 57 in a state in which the electrode X11 is selected. The microprocessor 58 stores, as t1, a time at which the signal level becomes equal to or more than the above-described determined value. The microprocessor 58 starts an operation of receiving data from the stylus pen at a time after a wait for a fixed time Tw from time t1 (step 2). This time Tw is assumed to be taken for the signal level received by the tablet to become substantially zero after an end of transmission of the start signal from the stylus pen 50, and is set to be a time determined in advance.

The microprocessor 58 starts a timer not shown in the figures at the same time that the above-described waiting time reaches Tw. This timer repeatedly counts a value coinciding with the above-described time Td (cycle of data transmission from the stylus pen) from zero (step 2). During the operating period of one cycle of the timer, the microprocessor 58 repeatedly starts the sample and hold circuit 56 and the AD converting circuit 57 to read the signal level. When the signal level during this period has not even once reached the above-described determined value, it is determined that there is no transmission from the stylus pen 50, and data in that cycle is stored as "0." When the signal level equal to or more than the determined value is detected during that period, it is determined that there is a transmission from the stylus pen, and data in that cycle is stored as "1" (step 2).

The counting of the above-described timer is performed 11 times, and thus data of 11 bits is stored. This data of 11 bits corresponds to the data of 11 bits shown in FIG. 26, and is a result of detection of a pen pressure applied to the position indicating module 40 of the stylus pen 50. FIG. 30 represents a case where the pen pressure data is "10101110101."

Incidentally, in step 2, the data reception is performed while the electrode (X11) from which the maximum level is detected is selected from among the X-axis electrodes. However, this reception may be performed while the electrode (Y20) from which the maximum level is detected is selected from among the Y-axis electrodes.

After the reception of the data of 11 bits is ended in step 2, a transition is made to the operation of detecting a start of a period of continuous transmission from the stylus pen (step 1), and the microprocessor 58 repeatedly performs the operation of FIG. 29.

The coordinate position (X, Y) of the stylus pen 50 is obtained by the following equation from the reception levels obtained in the above-described step 1.

$$X=Px+(Dx/2)\times((VBX-VAX)/(2\times VPX-VAX-VBX)) \quad \text{(equation 1)}$$

where Px is the coordinate position of the electrode from which the maximum level is detected on the X-axis (electrode X11 in this case), and Dx is an arrangement pitch between the X-axis electrodes.

$$Y=Py+(Dy/2)\times((VBY-VAY)/(2\times VPY-VAY-VBY)) \quad \text{(equation 2)}$$

where Py is the coordinate position of the electrode from which the maximum level is detected on the Y-axis (electrode Y20 in this case), and Dy is an arrangement pitch between the Y-axis electrodes.

[Effects of Embodiments]

According to the position indicating modules according to the first to fourth embodiments, the part acting to return the pen core 17 when a pen pressure disappears and the connecting portion for connection to the third electrode 18 are similar structures (a coil spring or a polyimide film). Thus, the connecting portion for connection to the third electrode 18 does not affect pen pressure detection. It is therefore possible to realize an electrostatic stylus pen capable of accurately detecting a change in a pen pressure applied by a light touch.

According to the position indicating module according to the fifth embodiment, the connection line (flexible part 36c of the polyimide film 36) for connection to the electrode in the pen core is in a direction at a right angle to the direction of displacement of the pen core 33. Thus, the connection line does not affect pen pressure detection. It is therefore possible to realize an electrostatic stylus pen capable of accurately detecting a change in a pen pressure applied by a light touch.

DESCRIPTION OF REFERENCE NUMERALS

11 Dielectric
12 First electrode
13, 30, 35 Second electrode
14 Spacer
15 First terminal
16 Second terminal
17, 33 Pen core
18 Third electrode
19, 23, 37 Coil spring
20, 31, 34, 340 Core body holder
21, 27 Pressing body
22, 25, 28, 32, 38 Housing
24, 26, 29, 36 Polyimide film
40 Position indicating module
41 Electric double layer capacitor
42 Coil
43 Printed board
44, 58 Microprocessor
45 Oscillating circuit
46 Modulating circuit
47 Charging circuit
48 Voltage converting circuit
50 Stylus pen
51 Tablet sensor
52 Selecting circuit
53 Amplifying circuit
54 Band-pass filter circuit
55 Detecting circuit
56 Sample and hold circuit
57 AD converting circuit
111 Core holder

The invention claimed is:

1. A position indicating device, comprising:
a variable capacitance capacitor having:
 a first electrode;
 a second electrode formed of a conductive elastic member; and
 a dielectric separating the first electrode and the second electrode, the dielectric having a first surface and a second surface opposed to the first surface, the first electrode being disposed on the first surface of the dielectric, the second electrode being disposed so as to face the second surface of the dielectric. wherein,
 in response to application of pressure to the variable capacitance capacitor, an area of contact of the second electrode with the second surface is changed to vary a capacitance, of the variable capacitance capacitor, and in the absence of application of pressure to the variable capacitance capacitor the second surface of the dielectric and the second electrode are separated from each other by a small interval;
an elongated core body having a tip and a proximal end opposite from the tip, the proximal end including a conductive portion, the tip including a third electrode for transmission of a signal, and the third electrode being, electrically connected to the conductive portion, wherein, in operation, pressure applied to the tip of the elongated core body is transmitted, via the proximal end, to the variable capacitance capacitor, varying the capacitance of the variable capacitance capacitor:
a first terminal electrically connected to the first electrode;
a second terminal electrically connected to the second electrode;
a third terminal; and
a core body holder supporting a conductive spring and configured to electrically connect the third electrode, via the conductive spring, to the third terminal, wherein the core body holder is configured to removably receive the proximal end of the elongated core body.

2. The position indicating device of claim 1 wherein, the variable capacitance capacitor comprises a semiconductor device having the dielectric and the first and second electrodes,
the dielectric comprises an air layer interposed between the first and second electrodes, and, in operation,
at least one of the first and second electrodes bends in response to application of pressure.

3. The position indicating device of claim 1 wherein at least part of a connection between the third terminal and the third electrode is formed of a flexible material.

4. The position indicating device of claim 1 wherein, the second electrode and the core body holder are secured to two opposite surfaces of a circuit board.

5. The position indicating device of claim 1, comprising:
a flexible substrate having a first side and a second side opposite of the first side, wherein a conductive material on the first side of the flexible substrate electrically couples the second electrode to the second terminal and a conductive material on the second side of the flexible substrate electrically couples the third electrode to the third terminal.

6. The position indicating device of claim 1 wherein, the conductive portion and the third terminal are connected to each other by a flexible electric wire extending in a direction perpendicular to an axis of the elongated core body.

7. The position indicating device of claim 6 wherein, the elongated core body includes a plurality of third electrodes, and each of the plurality of third electrodes is connected electrically, via a flexible electric wire corresponding to the respective electrode of the plurality of third electrodes, to the conductive portion of the elongated core body.

8. The position indicating device of claim 1 wherein, the elongated core body includes a core formed in a rod shape by a conductive member and constituting the third electrode, and
the core body holder transmits pressure applied to the tip of the core body to the variable capacitance capacitor.

9. An electrostatic stylus pen comprising:
a variable capacitance capacitor having:
a first electrode;
a second electrode formed of a conductive elastic member; and
a dielectric separating the first electrode and the second electrode, the dielectric having a first surface and a second surface opposed to the first surface, the first electrode being disposed on the first surface of the dielectric, the second electrode being disposed so as to face the second surface of the dielectric, wherein, in response to application of pressure to the variable capacitance capacitor, an area of contact o the second electrode with the second surface is changed to vary a capacitance of the variable capacitance capacitor, and in the absence of application of pressure to the variable capacitance capacitor the second surface of the dielectric and the second electrode are separated from each other by a small interval;
an elongated core body having a tip and a proximal end opposite from the tip, the proximal end including a conductive portion, the tip including a third electrode, and the third electrode being electrically connected to the conductive portion, wherein, in operation, pressure applied to the tip of the elongated core body is transmitted, via the proximal end to the variable capacitance capacitor, varying the capacitance of the variable capacitance capacitor;
a first terminal electrically connected to the first electrode;
a second terminal electrically connected to the second electrode;
a third terminal;
a core body holder supporting a conductive spring and configured to electrically connect the third electrode, via the conductive spring, to the third terminal, wherein the core body holder is configured to removably receive the proximal end of the elongated core body: and
circuitry coupled to the first, second and third electrodes, wherein the circuitry, in operation, converts a capacitance of the variable capacitor into a signal indicative of a pen pressure and generates a transmission signal transmitted from the third electrode.

10. The electrostatic stylus pen of claim 9 wherein, the variable capacitance capacitor comprises a semiconductor device having the dielectric and the first and second electrodes,
the dielectric comprises an air layer interposed between the first and second electrodes, and, in operation,
at least one of the first and second electrodes bends in response to application of pressure.

11. The electrostatic stylus pen of claim 9 wherein, the second electrode and the core body holder are secured to two opposite surfaces of a circuit board.

12. The electrostatic stylus pen of claim 9, comprising:
a flexible substrate having a first side and a second side opposite of the first side, wherein a conductive material on the first side of the flexible substrate electrically couples the second electrode to the second terminal and a conductive material on the second side of the flexible substrate electrically couples the third electrode to the third terminal.

13. The electrostatic stylus pen of claim 9 wherein, the conductive portion and the third terminal are connected to each other by a flexible electric wire extending in a direction perpendicular to an axis of the elongated core body.

14. The electrostatic stylus pen of claim 9 wherein, the elongated core body includes a plurality of third electrodes, and each of the plurality of third electrodes is connected electrically, via a flexible electric wire corresponding to the respective electrode of the plurality of third electrodes, to the conductive portion of the elongated core body.

15. The electrostatic stylus pen of claim 9 wherein, the elongated core body includes a core formed in a rod shape by a conductive member and constituting the third electrode, and the core body holder transmits pressure applied to the tip of the core body to the variable capacitance capacitor.

* * * * *

UNITED STATES PATENT AND TRADEMARK OFFICE
CERTIFICATE OF CORRECTION

PATENT NO. : 10,331,243 B2
APPLICATION NO. : 15/188770
DATED : June 25, 2019
INVENTOR(S) : Yuji Katsurahira Page 1 of 1

It is certified that error appears in the above-identified patent and that said Letters Patent is hereby corrected as shown below:

In the Claims

Column 22, Claim 1, Line 65:
"dielectric. wherein," should be -- dielectric, wherein, --

Column 23, Claim 1, Line 2:
"to vary a capacitance, of the variable" should be -- to vary a capacitance of the variable --

Column 23, Claim 1, Line 11:
"being, electrically connected" should be -- being electrically connected --

Column 24, Claim 9, Line 10:
"of contact o the second" should be -- of contact of the second --

Column 24, Claim 9, Line 24:
"via the proximal end to the variable capacitance" should be -- via the proximal end, to the variable capacitance --

Column 24, Claim 9, Line 34:
"elongated core body: and" should be -- elongated core body; and --

Signed and Sealed this
Seventeenth Day of March, 2020

Andrei Iancu
*Director of the United States Patent and Trademark Office*